(12) United States Patent
Cannata et al.

(10) Patent No.: US 12,596,657 B2
(45) Date of Patent: *Apr. 7, 2026

(54) NETWORK INSTANTIATED PERIPHERAL DEVICES

(71) Applicant: Liqid Inc., Broomfield, CO (US)

(72) Inventors: James Scott Cannata, Denver, CO (US); Allen R. Andrews, Broomfield, CO (US); Henry Lee Harris, Redding, CA (US)

(73) Assignee: Liqid Inc., Westminster, CO (US)

( * ) Notice: Subject to any disclaimer, the term of this patent is extended or adjusted under 35 U.S.C. 154(b) by 42 days.

This patent is subject to a terminal disclaimer.

(21) Appl. No.: 18/537,869

(22) Filed: Dec. 13, 2023

(65) Prior Publication Data

US 2024/0104029 A1    Mar. 28, 2024

Related U.S. Application Data

(63) Continuation of application No. 17/581,605, filed on Jan. 21, 2022, now Pat. No. 11,886,356.

(60) Provisional application No. 63/284,089, filed on Nov. 30, 2021.

(51) Int. Cl.
*G06F 13/12* (2006.01)

(52) U.S. Cl.
CPC .......... *G06F 13/126* (2013.01); *G06F 13/128* (2013.01)

(58) Field of Classification Search
CPC .... G06F 13/102; G06F 13/105; G06F 13/126; G06F 13/128; G06F 13/4282
See application file for complete search history.

(56) References Cited

U.S. PATENT DOCUMENTS

| | | | |
|---|---|---|---|
| 10,452,570 B1 | 10/2019 | Liguori | |
| 10,608,819 B1 | 3/2020 | Brown et al. | |
| 11,449,963 B1 | 9/2022 | Beeler et al. | |
| 11,886,356 B2 * | 1/2024 | Cannata | G06F 13/105 |
| 2003/0131227 A1 | 7/2003 | Gardiner et al. | |
| 2005/0251561 A1 * | 11/2005 | Hanes | H04L 61/00 |
| | | | 709/217 |
| 2006/0026317 A1 * | 2/2006 | Niikura | G06F 13/102 |
| | | | 710/62 |
| 2007/0174033 A1 | 7/2007 | Huang et al. | |

(Continued)

FOREIGN PATENT DOCUMENTS

| | | |
|---|---|---|
| JP | 2012215987 A | 11/2012 |
| WO | 2015138245 A1 | 9/2015 |

OTHER PUBLICATIONS

International Search Report & Written Opinion for PCT Application PCT/US2023/06735, mailed Feb. 21, 2023; 10 pages.

(Continued)

*Primary Examiner* — Phong H Dang

(57) ABSTRACT

Enhanced apparatuses, systems, and techniques for coupling network-linked peripheral devices into host computing devices is presented. A method includes, over a network interface of a host device, obtaining an indication of a peripheral device available for associating with the host device. Based on the indication, the method includes initiating instantiation of the peripheral device into a Peripheral Component Interconnect Express (PCIe) subsystem of the host device by at least emulating behavior of the peripheral device over the network interface as a PCIe peripheral device coupled locally to the host system.

20 Claims, 6 Drawing Sheets

(56)                    References Cited

U.S. PATENT DOCUMENTS

| | | | |
|---|---|---|---|
| 2009/0006710 A1 | 1/2009 | Daniel et al. | |
| 2010/0106881 A1 | 4/2010 | Daniel | |
| 2010/0161872 A1 | 6/2010 | Daniel | |
| 2011/0167190 A1 | 7/2011 | Lin et al. | |
| 2015/0074322 A1 | 3/2015 | Galles | |
| 2015/0234762 A1 | 8/2015 | Townsend | |
| 2015/0254193 A1 | 9/2015 | Priest et al. | |
| 2016/0098365 A1* | 4/2016 | Bshara ................ | G06F 13/4282 |
| | | | 710/313 |
| 2018/0121383 A1 | 5/2018 | Peng et al. | |
| 2019/0087359 A1 | 3/2019 | Litichever et al. | |
| 2019/0166090 A1 | 5/2019 | Kim | |
| 2021/0390118 A1 | 12/2021 | Gorkin et al. | |
| 2022/0075747 A1* | 3/2022 | Shuler ................ | G06F 13/4022 |
| 2022/0206964 A1 | 6/2022 | Kim et al. | |
| 2022/0308764 A1 | 9/2022 | Pismenny et al. | |
| 2022/0309019 A1 | 9/2022 | Duer et al. | |

OTHER PUBLICATIONS

FabreX Gen4 Top of Rack PCIe Switch Hyper-Performance Network; Gigaio Data Sheet; 2020; 2 pages.
FabreX Gen3 Top of Rack PCIe Switch Hyper-Performance Network; Gigaio Data Sheet; 2020; 2 pages.
FA4004—FabreX Gen4 PCIe Adapter for Hyper-Performance Rack-Scale Composable Infrastructure; Gigaio Data Sheet; 2020; 2 pages.
PCIe Gen 3 Network Adapter Card for the FabreX Hyper-Performance Network; Gigaio Data Sheet; 2020; 2 pages.
GigaIO FabreX U.2 Resource Box—Disaggregated NVMe SSD Storage; Gigaio Data Sheet; 2020; 1 page.
International Search Report and Written Opinion for PCT Application No. PCT/US2023/063579, mailed May 26, 2023; 12 pages.

* cited by examiner

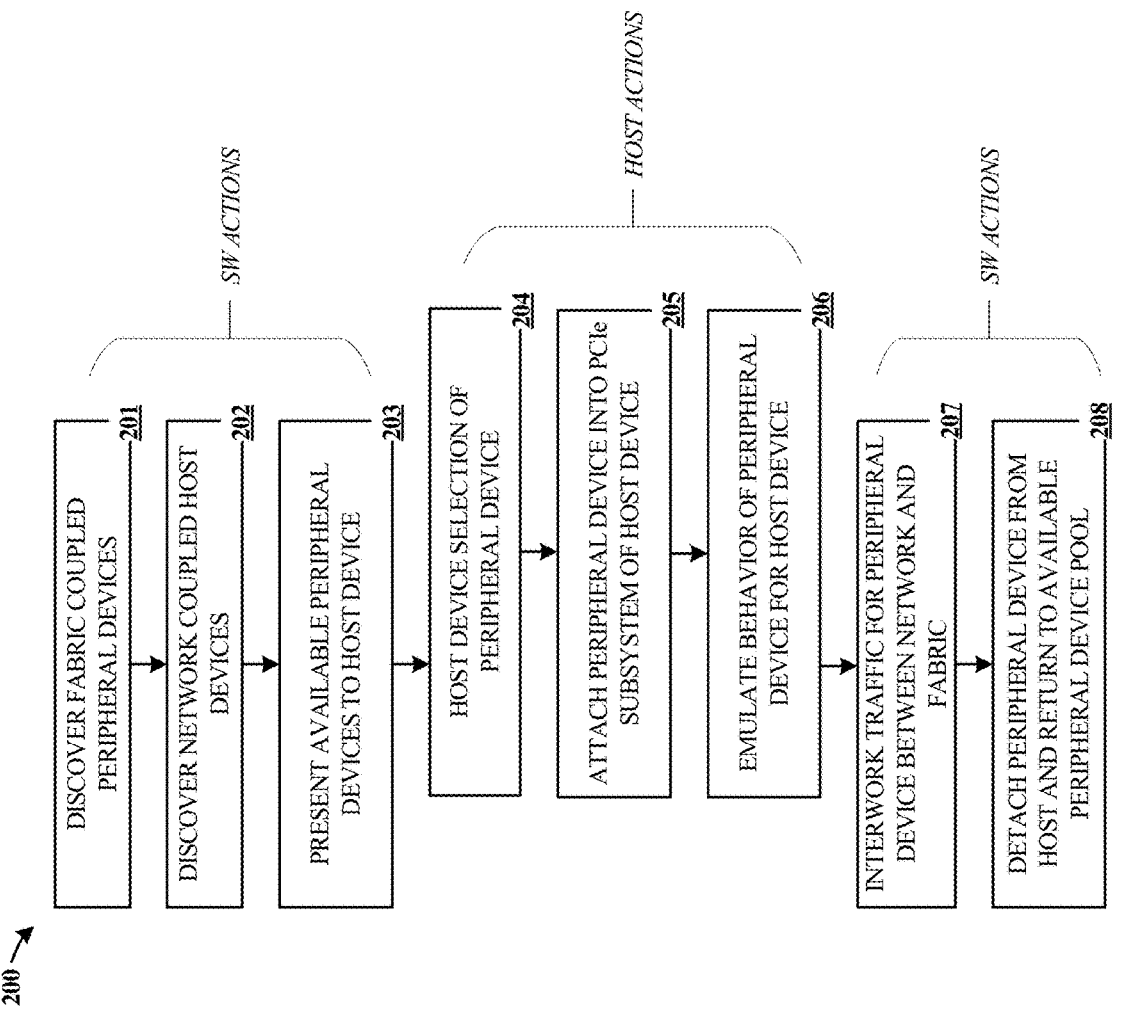

*SW ACTIONS*

DISCOVER FABRIC COUPLED PERIPHERAL DEVICES 201

DISCOVER NETWORK COUPLED HOST DEVICES 202

PRESENT AVAILABLE PERIPHERAL DEVICES TO HOST DEVICE 203

*HOST ACTIONS*

HOST DEVICE SELECTION OF PERIPHERAL DEVICE 204

ATTACH PERIPHERAL DEVICE INTO PCIe SUBSYSTEM OF HOST DEVICE 205

EMULATE BEHAVIOR OF PERIPHERAL DEVICE FOR HOST DEVICE 206

*SW ACTIONS*

INTERWORK TRAFFIC FOR PERIPHERAL DEVICE BETWEEN NETWORK AND FABRIC 207

DETACH PERIPHERAL DEVICE FROM HOST AND RETURN TO AVAILABLE PERIPHERAL DEVICE POOL 208

NETWORK INSTANTIATED PERIPHERAL DEVICES

RELATED APPLICATIONS

This application is a continuation of, and claims priority to, U.S. patent application Ser. No. 17/581,605, entitled "LOCAL INSTANTIATION OF REMOTE PERIPHERAL DEVICES," and filed Jan. 21, 2022. This application hereby claims the benefit of and priority to U.S. Provisional Patent Application 63/284,089, entitled "LOCAL INSTANTIA- TION OF REMOTE PERIPHERAL DEVICES," and filed Nov. 30, 2021.

BACKGROUND

Clustered computing systems have become popular as demand for data storage, data processing, and communica- tion handling has increased. Data centers typically include large rack-mounted and network-coupled data storage and data processing systems. These data centers can receive data for storage from external users over network links, as well as receive data as generated from applications that are executed upon processing elements within the data center. Many times, data centers and associated computing equip- ment can be employed to execute jobs for multiple concur- rent users or applications. The jobs include execution jobs which can utilize resources of a data center to process data using central processing units (CPUs) or graphics processing units (GPUs), as well as to route data associated with these resources between temporary and long-term storage, or among various network locations. GPU-based processing has increased in popularity for use in artificial intelligence (AI) and machine learning regimes. In these regimes, com- puting systems, such as blade servers, can include one or more GPUs along with associated CPUs for processing of large data sets.

However, density limitations can arise in large computing clusters. Specifically, blade servers typically include a fixed arrangement between a CPU, GPU, and storage elements which are housed in a common enclosure or chassis. When incoming jobs are deployed within the data center, the granularity for computing resources is limited to individual servers. Thus, deployed jobs typically take up one or more servers along with all of the corresponding CPU, GPU, and storage elements of each server, regardless of whether or not the entire resources of the server are actually needed to execute the jobs. To compensate, operators of data centers typically deploy a continually-increasing quantity of servers to accommodate increasing traffic from jobs. This strategy can encounter barriers on required physical space for rack- mounted servers, as well as the large space and cost require- ments.

Overview

Enhanced apparatuses, systems, and techniques are pre- sented for coupling remotely located communication fabric coupled peripheral devices into host computing systems as local devices over communication network links. These enhancements can provide for peripheral devices, such as GPUs, FPGAs, or ASICs (referred to as co-processing units (CoPUs) or data processing accelerators), to be utilized on-demand by host computing systems over network links. These peripheral devices can then be arbitrarily associated and de-associated with various host devices (such as servers or other computing systems) as if the peripheral devices were local peripherals plugged into the host devices. Thus, a host device can add a larger quantity of peripheral devices for use in processing workloads or user data than would normally be feasible compared to physically plugging peripheral devices into a motherboard of the host device.

In one example implementation, a method includes, over a network interface of a host device, obtaining an indication of a peripheral device available for associating with the host device. Based on the indication, the method includes initi- ating instantiation of the peripheral device into a local peripheral interconnect interface of the host device by at least emulating behavior of the peripheral device coupled over the network interface as a local peripheral device coupled to the peripheral interconnect interface of the host system.

In another example implementation, an apparatus includes one or more computer readable storage media and program instructions stored on the one or more computer readable storage media. When executed by a processing system, the program instructions direct the processing sys- tem to at least, over a network interface of a host device, obtain an indication of a peripheral device available over the network interface for associating with the host device. Based on the indication, the program instructions direct the pro- cessing system to initiate instantiation of the peripheral device into a local peripheral interconnect interface of the host device by at least emulating behavior of the peripheral device coupled over the network interface as a local periph- eral device coupled to the peripheral interconnect interface of the host system.

In yet another example implementation, a software ele- ment comprises a local interface configured to communicate with a local peripheral interconnect interface of a host device, and a remote interface configured to communicate with a network stack of a network interface of the host device. An interworking unit is included and configured to, over the remote interface, obtain an indication of a periph- eral device available over the network interface for associ- ating with the host device. Based on the indication, the interworking unit is configured to initiate instantiation of the peripheral device into the local peripheral interconnect inter- face of the host device by at least emulating behavior of the peripheral device coupled over the network interface as a local peripheral device coupled to the host system.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the sev- eral views. While several embodiments are described in connection with these drawings, the disclosure is not limited to the embodiments disclosed herein. On the contrary, the intent is to cover all alternatives, modifications, and equiva- lents.

FIG. 2 includes a flow diagram that illustrates an opera- tional example of a computing system in an implementation.

DETAILED DESCRIPTION

Figure 1:
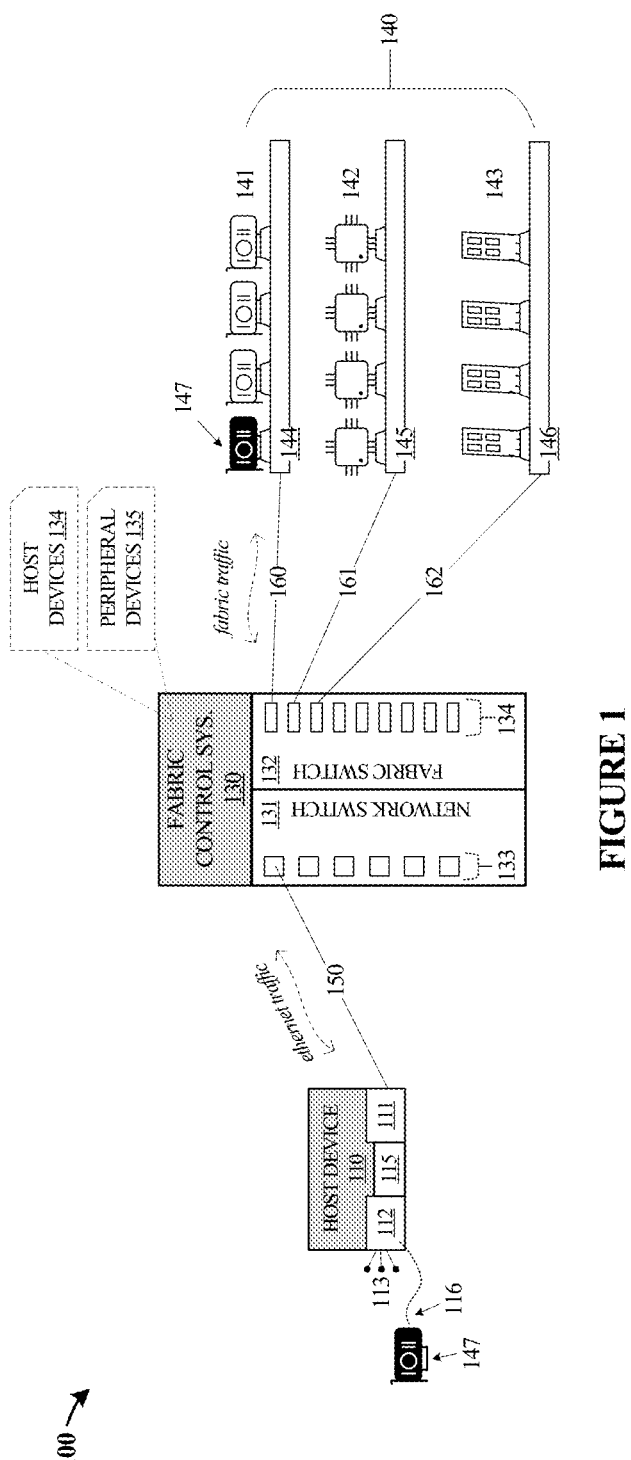
FIG. 1 is a diagram illustrating a computing system in an implementation.

Data centers with associated computing equipment can be employed to handle execution jobs to process data as well as to shuttle data associated with execution jobs between temporary and long-term storage, or among various network destinations. Data processing elements can include central processing units (CPUs) along with various types of peripheral devices. These peripheral devices can include co-processing units (CoPUs) or data processing accelerators, such as graphics processing units (GPUs), tensor processing units (TPUs), field-programmable gate arrays (FPGAs), or application-specific integrated circuits (ASICs). Data processing of host device CPUs augmented by CoPUs has increased in popularity for use in artificial intelligence (AI), machine learning systems, cryptocurrency mining and processing, advanced graphical visualizations, biological systems modeling, self-driving vehicle systems, and other various tasks. In the examples herein, limitations of host computer systems can be overcome using disaggregated peripheral devices which can dynamically be attached to host systems while not being locally-coupled to data buses of such host systems. Instead of having a fixed arrangement between a host device and peripheral devices, which are housed in a common enclosure or chassis, the examples herein can flexibly include any number of peripheral devices that span any number of enclosures/chassis and are dynamically formed into logical arrangements over a communication network. Thus, a computing system can better utilize resources by not having idle or wasted portions of a blade server which are not needed for a particular task or for a particular part of a task. A data center operator can achieve very high utilization levels for a data center, greater than can be achieved using fixed-arrangement servers, and can augment existing servers with additional capabilities over pre-existing network connections.

The systems and operations discussed herein provide for dynamic assignment of peripheral resources, such as computing resources (CPUs), graphics processing resources (GPUs), network resources (NICs), storage resources (SSDs), programmable logic resources (FPGAs), and memory resource (RAM), to host devices, even though the peripheral resources are not locally-coupled to the host devices. The peripheral resources are disaggregated and reside in a pool of unused, unallocated, or free peripheral resources until allocated (composed) to host devices. A management processor, fabric controller, or fabric control system can control composition and de-composition and provide interfaces to external users, job management software, or orchestration software. Peripheral resources and other elements (graphics processing, network, storage, FPGA, RAM, or other) can be attached/detached in and out of host devices on-the-fly, and these resources can be assigned to other host devices. In one example, graphics processing resources can be attached to a first host device and subsequently provide graphics processing status/results to another host device after detaching from the first host device. In another example, when resources experience failures, hangs, overloaded conditions, then additional peripheral resources can be introduced into host devices to supplement existing resources.

As a first example system, FIG. 1 is presented. FIG. 1 is a system diagram illustrating computing system 100 which employs enhanced peripheral device composition techniques. System 100 includes host device 110, fabric control system 130, network switch 131, communication fabric switch 132, and disaggregated peripheral devices 140. Host device 110 communicate over network links 150-151 with network switch 131. Peripheral devices 140 communicate over communication fabric links 160-162 with fabric switch 132. Although only one host device is shown in FIG. 1, it should be understood that further host devices can be included and coupled to network switch 131 over associated network links.

Host devices 110 includes network interface 111, local peripheral interconnect interface 112, and peripheral over fabric (PoF) system 115. Network interface 111 is coupled over network link 150 to network switch 131. Local interface 112 is coupled over local links (not shown) to local peripheral devices 113. PoF system 115 is coupled to both network interface 111 and local interface 112 over software connections, such as via software interfaces into associated protocol stacks or programming interfaces of network interface 111 and local interface 112.

In operation, host device 110 can execute system software and user applications for various tasks using on-board central processing units (CPUs) along with peripheral devices including graphics processing devices, data storage devices, memory devices, and user interface devices. Operators of host device 110 may desire to add additional peripheral devices for use by host devices. To facilitate the addition of additional peripheral devices into a host system without physically plugging such peripheral devices into host systems, various enhanced techniques and systems are presented herein. Peripheral devices including data processing elements (such as CoPUs) or other peripheral devices (such as data storage or memory devices) can be configured to be associated with host device 110 even though such devices or elements are not physically local to host device 110. Elements included on host device 110 as well as in fabric control system 130 can enable remote peripheral devices to be added for use by host device 110 as if the remote peripheral devices were local devices coupled over a local interface, such as a PCIe interface. Thus, arbitrary associations between any of peripheral devices 140 and any of host device 110 can be made and changed on-the-fly. These associations are made over the network interfaces of host device 110 and communication fabric interfaces that couple to peripheral devices 140, as will be discussed in more detail below.

Turning now to a discussion on the elements of FIG. 1, host device 110 comprises a computing system having a processing elements, data storage and memory elements, and user interface elements. Examples of host device 110 include servers, blade servers, desktop computers, laptop computers, tablet computers, smartphones, gaming systems, elements of a distributed computing system, customer equipment, access terminals, Internet appliances, media players, or other computing systems. Typically, host device 110 will include a motherboard or other system circuit board having a central processing unit (CPU) coupled thereto along with memory devices, such as random access memory (RAM). The CPU can be a component in a processing system formed from among one or more microprocessor elements including Intel® microprocessors, Apple® microprocessors, AMD® microprocessors, ARM® microprocessors, field-programmable gate arrays (FPGAs), application specific integrated circuits (ASICs), tensor processors, application specific processors, or other microprocessors or processing elements. Various peripheral devices can physically couple locally to peripheral interconnect interfaces of host device 110 via corresponding slots, connectors, or over cabling within an enclosure or chassis of host device 110. These peripheral devices can include graphics cards housing graphics processing units (GPUs), data storage drives using various computer-readable media, network interface controllers (NICs) having physical layer elements to couple to network links (e.g. Ethernet), or other devices including user interface devices. For example, PCIe devices might be included in host device 110 which are coupled into PCIe slots on a motherboard of host device 110. Such devices are referred to as local peripheral devices. Host device 110 also includes various software which is executed by a processing system of host device 110. This software typically includes operating systems, user applications, device drivers, user data, hypervisor software, telemetry software, or other various software elements.

Fabric control system 130 comprises control and interworking elements for network switch 131 and fabric switch 132. Fabric control system 130 can be included in a fabric management module or top-of-rack (ToR) switch chassis. Fabric control system 130 comprises a management operating system (OS), operator control interfaces, and various other elements—such as shown in FIGS. 4-7. Fabric control system 130 can comprise one or more microprocessors and other processing circuitry that retrieves and executes software from an associated storage system (not shown). Fabric control system 130 can be implemented within a single processing device but can also be distributed across multiple processing devices or sub-systems that cooperate in executing program instructions. Examples of fabric control system 130 include general purpose central processing units, application specific processors, and logic devices, as well as any other type of processing device, combinations, or variations thereof. In some examples, fabric control system 130 comprises an Intel® microprocessor, Apple® microprocessor, AMD® microprocessor, ARM® microprocessor, FPGA, ASIC, application specific processor, or other microprocessor or processing elements. Fabric control system 130 includes at least one network interface and at least one fabric interface. The network interface comprises a network stack and associated physical layer interfaces used to communicate with network switch 131 and control elements of network switch 131, as well as communicate with devices coupled to ports 133 of network switch 131. The fabric interface comprises a communication link subsystem used to communicate with fabric switch 132 and between peripheral devices coupled to ports 134 of fabric switch 132. The fabric interface may comprise one or more PCIe interfaces or other suitable fabric interfaces.

Network switch 131 includes network ports 133 that provide switched network connections for host devices, such as shown for network link 150. Network switch 131 includes various network switching circuitry to communicatively link individual ports to other ports based on traffic patterns, addressing, or other traffic properties. In one example, network switch 131 comprises an Ethernet or Wi-Fi (802.11xx) switch corresponding to wired or wireless connections, which can refer to any of the various network communication protocol standards and bandwidths available, such as 10BASE-T, 100BASE-TX, 1000BASE-T, 10GBASE-T (10 GB Ethernet), 40GBASE-T (40 GB Ethernet), gigabit (GbE), terabit (TbE), 200 GbE, 400 GbE, 800 GbE, or other various wired and wireless formats and speeds.

Fabric switch 132 includes fabric ports 134. Fabric ports 134 couple to peripheral devices 140 over associated fabric links, typically comprising point-to-point multi-lane serial links. In FIG. 1, fabric ports 134 are shown coupled to sets or groups of peripheral devices 140, where those groups include individual peripheral devices coupled to a backplane which has a shared fabric connection. For example, backplane 144 couples to fabric ports 134 over link 160, backplane 145 couples to fabric ports 134 over link 161, and backplane 146 couples to fabric ports 134 over link 162. Although individual peripheral devices are shown organized by type of device in FIG. 1, it should be understood that any arbitrary arrangement of peripheral devices can instead be employed, and that individual peripheral devices can be coupled to fabric ports 134 without the use of a shared backplane.

Fabric switch 132 comprises at least a portion of a communication fabric formed from one or more fabric switch elements. In one example of a communication fabric, a PCIe fabric is employed. A PCIe fabric is formed from PCIe switch circuitry, which may be referred to as PCIe crosspoint switches. PCIe switch circuitry can be configured to logically interconnect various PCIe links based at least on the traffic carried by each PCIe link. A domain-based PCIe signaling distribution can be included which allows segregation of PCIe ports of a PCIe switch according to operator-defined groups. The operator-defined groups can be managed by fabric control system 130 which logically assembles and segregates components into logical groups. Fabric control system 130 can control PCIe switch circuitry over a fabric interface coupled to the PCIe fabric (i.e. to fabric switch 132), and alter the logical partitioning or segregation among PCIe ports and thus alter composition of groupings of the physical components. In addition to, or alternatively from, the domain-based segregation, each PCIe switch port can be a non-transparent (NT) port or transparent port. An NT port can allow some logical isolation between endpoints, much like a bridge, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port.

Advantageously, this domain-based segregation or NT port-based segregation can allow physical components (i.e. CPUs, CoPUs, data storage or memory devices, or NICs) to be coupled to a shared fabric or common fabric but only to have present visibility to those components that are included via the segregation/partitioning into a group or unit. Thus, groupings among a plurality of physical components can be achieved using logical partitioning among the communication fabric. This partitioning is scalable in nature, and can be dynamically altered as-needed by fabric control system 130 or other control elements. In some examples, each PCIe switch comprises PLX/Broadcom/Avago PEX series chips, such as PEX8796 24-port, 96 lane PCIe switch chips, PEX8725 10-port, 24 lane PCIe switch chips, PEX97xx chips, PEX9797 chips, or other PEX87xx/PEX97xx chips.

Peripheral devices 140, as mentioned above, can comprise various co-processing units (CoPUs) or data processing accelerators, such as graphics processing units (GPUs), tensor processing units (TPUs), field-programmable gate arrays (FPGAs), or application-specific integrated circuits (ASICs). Peripheral devices 140 can also include data storage devices, such as solid state storage devices (SSDs) that include flash memory or other media types, hard drives (HDDs) including rotating magnetic media, magnetoresistive random-access memory (MRAM), or other data storage devices having various media types and interface types. Peripheral devices 140 can include fabric-coupled memory devices, such as dynamic random-access memory (DRAM), static random-access memory (SRAM), 3D XPoint memory, solid state memory devices, MRAM devices, or other various memory devices. Peripheral devices 140 can include network interface controllers (NICs) including various network interface elements such as physical layer elements (PHY), transport layer elements, TCP/IP traffic handling elements, routers, switches, or bridges, along with associated cable connectors.

Figure 5:
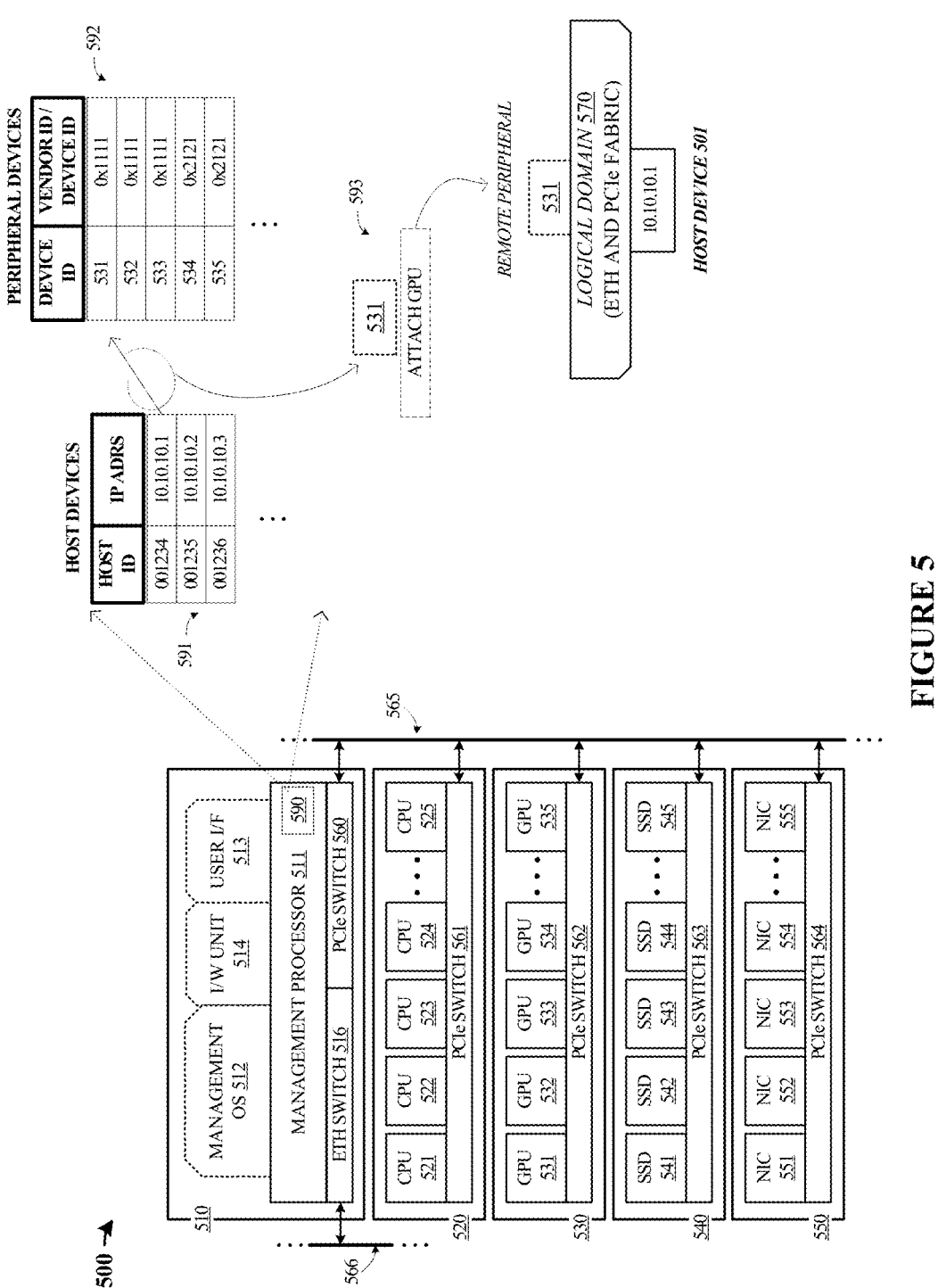
FIG. 5 is a diagram illustrating a computing system in an implementation.

In FIG. 1, peripheral devices 140 are coupled to individual backplanes (144-146) comprising circuit boards and can be included within individual chassis or enclosures (such as seen in FIG. 5). These backplanes can include connectors or sockets to couple each peripheral device into a communication fabric while providing multiplexing or sufficient ports for each device to connect concurrently. Various fabric switch circuitry can be included on the backplanes to couple the connected devices over a shared or common fabric link (160-162). Other configurations are possible, such as individually-coupled peripheral devices, multiple fabric links per backplane, or other configurations. In FIG. 1, a plurality of data processing accelerators are connected to backplane 144, such as GPUs, and communicate with fabric switch 132 over fabric link 160. A second plurality of data processing accelerators are connected to backplane 145, such as FPGAs, and communicate with fabric switch 132 over fabric link 161. A third plurality of devices, namely data storage or RAM devices, are coupled to backplane 146 and communicate with fabric switch 132 over fabric link 162.

Turning now to an example set of operations for the elements of FIG. 1, operations 200 are presented in FIG. 2. Operations 200 can be subdivided into those performed by fabric control system 130 (labeled as switch (SW) actions), and those performed by host device 110 (labeled as host actions), although the various operations might be performed by different devices than listed in FIG. 2.

In operation 201, fabric control system 130 discovers fabric coupled peripheral devices. This discovery process can include applying power to peripheral devices 140 and detecting initialization messaging provided by peripheral devices 140, such as device identifiers (ID), vendor IDs, memory space requests/requirements, addressing, and other information. This information can be provided automatically by peripheral devices upon power up or reset, or can be queried by fabric control system 130 using various protocol-specific commands or control traffic. Regardless of the technique used to discover individual peripheral devices over links 160-162, fabric control system 130 can establish and maintain one or more data structures which list these properties and identifiers for the peripheral devices. One example data structure is noted as "peripheral devices 135" in FIG. 1. Fabric control system 130 can update this data structure over time to add or remove peripheral devices as changes to their operational status, presence, or availability change.

In operation 202, a similar technique is performed by fabric control system 130 for network-coupled devices. Thus, fabric control system 130 performs a network discovery process to discover network coupled host devices, such as host device 110. In some examples, fabric control system

130 may discover many network devices but only catalogs host devices which support network-coupled peripheral device modes through use of specialized software deployed to such host devices. This specialized software, such as a driver or kernel-level module, can report statuses to fabric control system 130 which include mode support indications to fabric control system 130 along with host associated network addresses, network ports, or network sockets. A communication protocol or handshaking operation can be employed between host device 110 and fabric control system 130 which indicates a host IP address, a port number, and a login/password for host device 110 such that fabric control system 130 can issue attach/detach operations to host device 110. Regardless of the technique used to discover individual host devices over link 150, fabric control system 130 can establish and maintain one or more data structures which list these properties and identifiers for the host devices along with the corresponding IP address, port number, login/password parameters. One example data structure is noted as "host devices 134" in FIG. 1. Fabric control system 130 can update this data structure over time to add or remove host devices as changes to their operational status, presence, or availability change.

In response to discovery of host device 110 being able to support the network-coupled peripheral device mode, fabric control system 130 presents (203) available peripheral devices to host device 110 over network link 150. This list can be sourced from "peripheral devices 135" maintained by fabric control system 130. A subset of the total quantity of peripheral devices in "peripheral devices 135" can be provided based on host device 110 requesting only certain types of devices. PoF system 115 of host device 110 can then make a selection of a peripheral device (204), indicated over network interface 111 to fabric control system 130. This selection indicates an identity or identifier of a peripheral device that host device 110 desires to couple to over network link 150, such as a device ID or vendor ID used to identify the peripheral device on local peripheral interconnect interface 112.

Responsive to the selection by host system 110, fabric control system 130 indicates one or more commands that instruct PoF system 115 to attach (205) the peripheral device into host system 110. Taking peripheral device 147 as an example selected peripheral device, responsive to the instructions issued by fabric control system 130, PoF system 115 performs a hot plug or attach process to instantiate peripheral device 147 into local peripheral interconnect interface 112 of host device 110. This hot plug or attach process comprises triggering an entry point process, emulating to local peripheral interconnect interface 112, that a new hardware device is physically present in a slot or connector of host device 110, when that hardware device is actually not physically present in a slot or connector of host device 110. PoF system 115 calls an entry point process within local peripheral interconnect interface 112 without using any corresponding hardware interrupts or hardware indicators normally resultant from a physical plugging or powering on of a peripheral device into host device 110. This can also include modification of local peripheral interconnect interface 112 to accept interrupts or attach commands from PoF system 115 instead of only from hardware changes. PoF system 115 also emulates the hardware plugging process by providing address space descriptions to local peripheral interconnect interface 112 to access peripheral device 147 as a local peripheral device coupled to host system 110. In examples where local peripheral interconnect interface 112 comprises a PCIe subsystem of host device 110, an 'attach' command might be issued by PoF system 115 which indicates a vendor ID and device ID to the PCIe subsystem. The PCIe subsystem can also request or be provided with memory addressing locations for memory-mapped access to peripheral device 147. PoF system 115 can emulate these addressing locations and structural properties of such locations (e.g. buffer sizing and formats) to further emulate behavior of peripheral device 147.

Once instantiated into local peripheral interconnect interface 112 of host device 110, a device driver of host device 110 can interface with peripheral device 147 through local peripheral interconnect interface 112 to provide access to operating system processes, user applications, kernel resources, and other various interfacing. Any tools and libraries associated with the peripheral device driver will function identically for local peripheral devices coupled physically to host device 110 or peripheral devices mapped over a network link through PoF system 115. Thus, a device driver for peripheral device 147 is not typically aware that peripheral device 147 is not locally connected to host device 110. User applications, operating systems, kernel resources, hypervisors, and the like, all can interface with peripheral device 147 as normally done when connected locally—via PoF system 115 emulating (206) behavior of a local hardware interface of peripheral device 147 to local peripheral interconnect interface 112. This emulation can include behavior noted above for instantiation, and also for handling of communications thereafter between local peripheral interconnect interface 112 and network interface 111. These communications can include configuration traffic, command and control handshaking, input/output traffic, and read/write traffic or data transfer between host device 110 and peripheral device 147. Thus, PoF system 115 acts as an interworking unit for traffic for peripheral device 147 between local peripheral interconnect interface 112 and network interface 111. PoF system 115 interfaces with a network stack of network interface 111 to send and receive traffic to/from peripheral device 147 over network link 150. This can include intercepting host-originated traffic for peripheral device 147 from local peripheral interconnect interface 112, interpreting the host originated traffic to convert or re-bundle from a native format (e.g. PCIe frames or similar of local peripheral interconnect interface 112) into an IP packet format or Ethernet frame format suitable for transfer over network interface 111. Then, PoF system 115 routes the host-originated traffic in the packet format over network interface 111 for delivery to peripheral device 147 over link 150.

Fabric control system 130 can receive the host device-originated traffic over link 150. Since network link 150 couples to host device 110 and fabric link 160 couples to peripheral device 147, interworking operations between the two connection types is established. Fabric control system 130 provides interworking (207) between at least network link 150 and fabric link 160. This can comprise protocol conversion where network frames or IP packets are stripped of various network protocol-specific headers and then payload data is re-packaged or encapsulated into frames or packets (or other fabric-native datagrams) suitable for transfer over fabric link 160. For example, when fabric link 160 comprises a PCIe link, then frames suitable for transfer over PCIe link are created by fabric control system 130 based on the data received over link 150. This traffic is then transferred over link 160 for delivery to peripheral device 147. Various reads, writes, input/output, control, commands, or other traffic can be handled this way to transfer transactions to peripheral device 147 which originate at host device 110.

Likewise, the reverse operation can occur for transactions and responses originated by peripheral device 147 for transfer to host device 110. Specifically, frames or packets (or other fabric-native datagrams) received over link 160 are translated into frames or packets for transfer over link 150 by fabric control system 130.

Once received into host system 110 over link 150 and network interface 111, these network frames or packets are processed by a network stack of network interface 111. PoF system 115 communicates with the network stack of network interface 111 and interprets these received network frames or packets to convert into a native format suitable for local peripheral interconnect interface 112. Local peripheral interconnect interface 112 provides the communications in the native format to various software elements of host device 110, such as device drivers which interface with user-level applications. Host device 110 can thus use peripheral device 147 as if it were coupled locally to a local bus or connector of host device 110.

Once peripheral device 147 is no longer needed by host device 110, PoF system 115, upon instruction or command by fabric control system 130, can operate to remove peripheral device 147 from host device 110. This removal can occur by fabric control system 130 indicating a detach command to detach (208) peripheral device 147 from host device 110 and return peripheral device 147 to an available peripheral device pool. PoF system 115 can effect removing instantiation of peripheral device 147 from local peripheral interconnect interface 112 by at least emulating a hardware device removal process or "hot unplug" operation to local peripheral interconnect interface 112. This hot unplug or detach process comprises triggering an exit point process, emulating to local peripheral interconnect interface 112, that a hardware device is no longer physically present in a slot or connector of host device 110. PoF system 115 calls an exit point process within local peripheral interconnect interface 112 without using any corresponding hardware interrupts or hardware indicators normally resultant from a physical unplugging or powering off of a peripheral device into host device 110. This can also include modification of local peripheral interconnect interface 112 to accept interrupts or detach commands from PoF system 115 instead of only from hardware changes. Any established address space descriptions for peripheral device 147 in host device 110 can be deconstructed or removed in local peripheral interconnect interface 112. In other example, a 'detach' command might be issued by PoF system 115 which indicates a PCIe vendor ID and PCIe device ID of peripheral device 147 to local peripheral interconnect interface 112.

As mentioned, once peripheral device 147 is removed, it can be returned to a pool or peripheral devices that remain in an inactive detached state until needed by a host device or other device. An attach process can then proceed as noted above. A further discussion of the pools of components or peripheral devices is discussed in FIG. 5. Moreover, instead of a GPU or similar device to peripheral device 147, other fabric-coupled devices might be attached/detached as noted in the operations of FIG. 2, such as FPGAs, SSDs, NICs, memory devices, user interface devices, or other peripheral devices.

Figure 3:
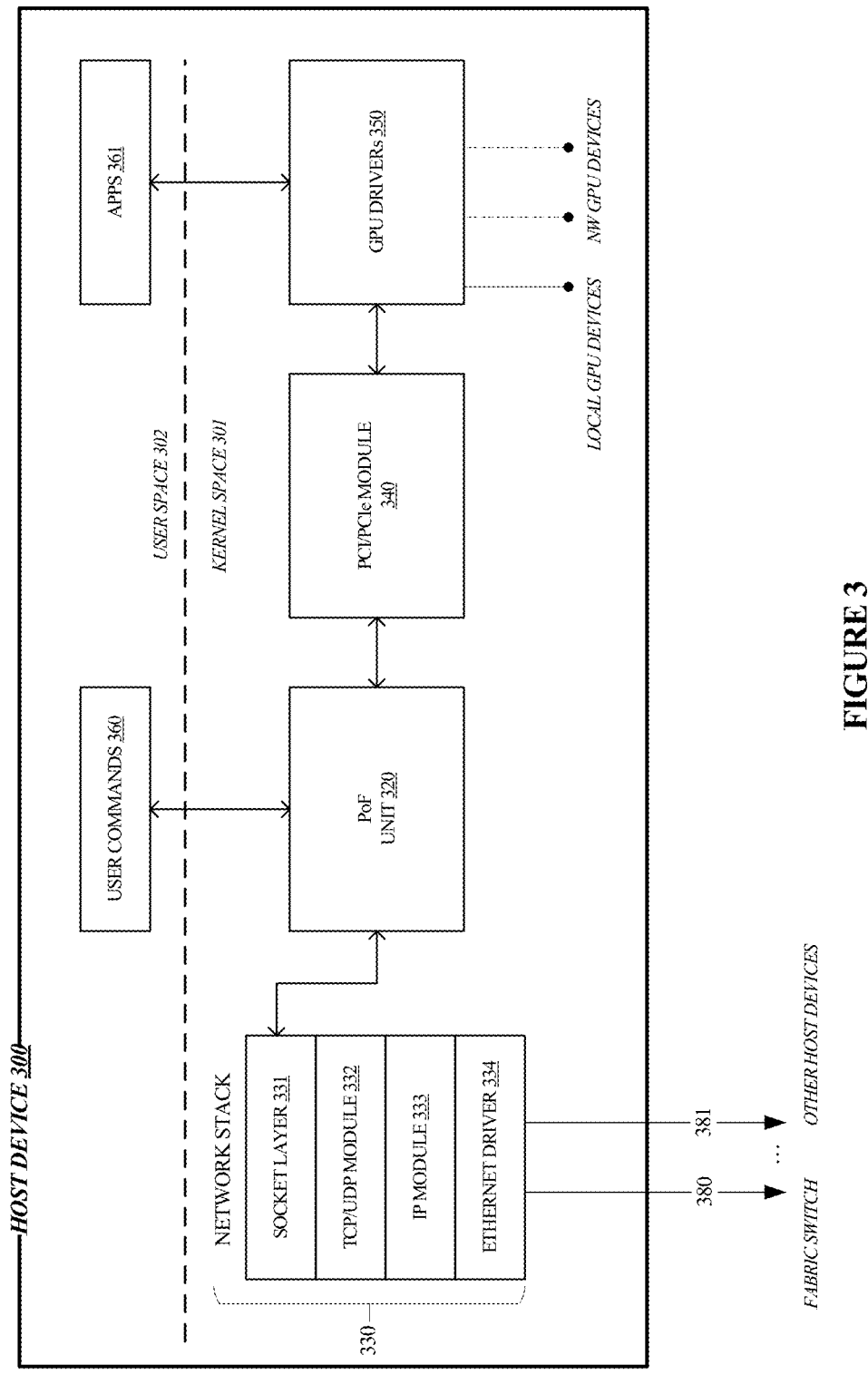
FIG. 3 is a diagram illustrating a host device in an implementation.

To discuss a more detailed structure and operation of a host device, FIG. 3 is presented. Although the elements of FIG. 3 can be applied to host device 110 of FIG. 1, it should be understood that host device 110 can employ other structures and operations. FIG. 3 includes host device 300 as an example of a computing device, server, computing system, blade server, or the like. Host device 300 can include one or more network links, each having an associated network address. For example, a first network link 380 can couple host device 300 to a network switch for coupling peripheral devices as discussed herein. Another network link 381 might communicate with other host devices, further networks, or the Internet, among other various networks and endpoints. The examples discussed regarding FIG. 3 also employ a TCP/IP style of networking for communication with host device 300 and a PCIe fabric for communication with peripheral devices.

Host device 300 includes a user space and kernel space. Kernel space 301 is a software system that comprises core operating system (OS) elements, such as the OS kernel, device drivers, hardware interfacing subsystems, network stacks, memory management subsystems, machine clock/time modules, and other low-level elements which are employed to act as an interface between the hardware components and user applications, as well as manage resources of host device 300 among user-level and kernel-level software. User space 302 includes user applications, tools, games, graphical or command line user interfacing elements, and other similar elements. Typically, user space elements interface with device driver elements of kernel space 301 through an application programming interface (API) or other software-defined interface to share access to the low-level hardware elements among all user software, such as network controllers, graphics cards, audio devices, video devices, user interface hardware, and various communication interfaces. These device driver elements receive user-level traffic and interact with hardware elements that ultimately drive link layer communications, data transfer, data processing, logic, or other low-level functions.

Within kernel space 301, host device 300 includes network stack 330, peripheral over fabric (PoF) unit 320, PCI/PCIe module 340, and device driver(s) 350. Other kernel-space elements are omitted for clarity and to focus on the kernel-level elements relevant to the operations herein. User space 302 includes user commands 360 and user applications 361. Network stack 330 comprises a TCP/IP stack and includes various layers or modules typical of network stacks, although some elements are omitted for clarity. Ethernet driver 334 includes features of the link layer, media access controller (MAC) addressing, Ethernet frame handling, and interfaces with a network interface controller (not shown) which then handles physical layer operations and structures. IP module 333 performs packet handling, IP addressing, and internetwork operations. TCP/UDP module 332 interfaces between data structures of user applications and IP module 333, as well as packetizes user data, handles error correction and re-transmission, acknowledgement of transfers, and the like. Socket layer 331 interfaces with user applications and other components of host device 300, and acts as an endpoint for packetized communications. Individual sockets can be established, each of which handles a particular communication purpose, type, protocol, or other communication segregation. Several sockets can be established by a network stack, each of which can act as an endpoint for distinct communication types. For TCP/UDP, a socket is typically identified by an IP address and a port number, and a host device can have many such port numbers for a single IP address, as well as multiple IP addresses each with their own set of port numbers. Thus, many sockets might be established, each having a particular purpose. User-level applications, user processes, or even kernel-level processes, modules, and elements can interface with the network stack through particular sockets.

In operation, responsive to attach/detach commands transferred by a fabric management/control entity (and directed to the socket noted above), PoF unit 320 can establish these targets by calling hot plug/unplug functions of PCI/PCIe module 340 and emulating hardware behavior to these functions. PoF unit 320 interfaces with socket layer 331 to transfer and receive packets transporting traffic related to peripheral devices which can be located remotely from host device 310. Instead of interfacing directly with socket layer 331, PoF unit 320 might instead use a TCP offload engine (TOE) stack and remote direct memory access (RDMA) for specific network interface controller vendor types. Socket layer 331, or equivalent noted above, will be identified by an IP address and port number and is typically dedicated to traffic related to a particular peripheral device or for all remote peripheral devices for host device 310. A username/password or other security credentials can be pass along with the packets received by socket layer 331. PoF unit 320 has 'hooks' or software interface features to communicate with socket layer 331. Packets arrive from peripheral devices through network stack 303 and are interpreted by PoF unit 320 which then translates the communications to a format suitable for PCI/PCIe module 340. The packets received by interworking unit 320 can include the PCIe device state information of the peripheral device. PCI/PCIe module 340 receives these communications from PoF unit 320 as if they originated from a local peripheral device of host device 110. Thus, PoF unit 320 emulates behavior of local peripheral devices to PCI/PCIe module 340, and such peripheral devices appear local to PCI/PCIe module 340. Device drivers, device tools or toolsets, and device-centric libraries function identically for locally connected PCIe devices or remote PCIe devices mapped through PoF unit 320. To achieve this emulation of a local device, PoF unit 320 can establish several functions or libraries which present targets for PCI/PCIe module 340 to communicate with for I/O transactions, configuration transactions, reads/writes, and other various communications.

Advantageously, user applications can interact with peripheral devices located remotely from host device 110 using standard device drivers 350 which interface with PCI/PCIe module 340. Communications issued by PCI/PCIe module 340 normally intended for local hardware devices are intercepted by PoF unit 320 and interpreted for transfer over network stack 330 and network link 380. When GPU peripheral devices are employed, in one example, graphics drivers can be employed without modification by user applications, such as machine learning, deep learning, artificial intelligence, or game applications, even though a GPU might be remotely located with regard to host device 300.

Figure 4:
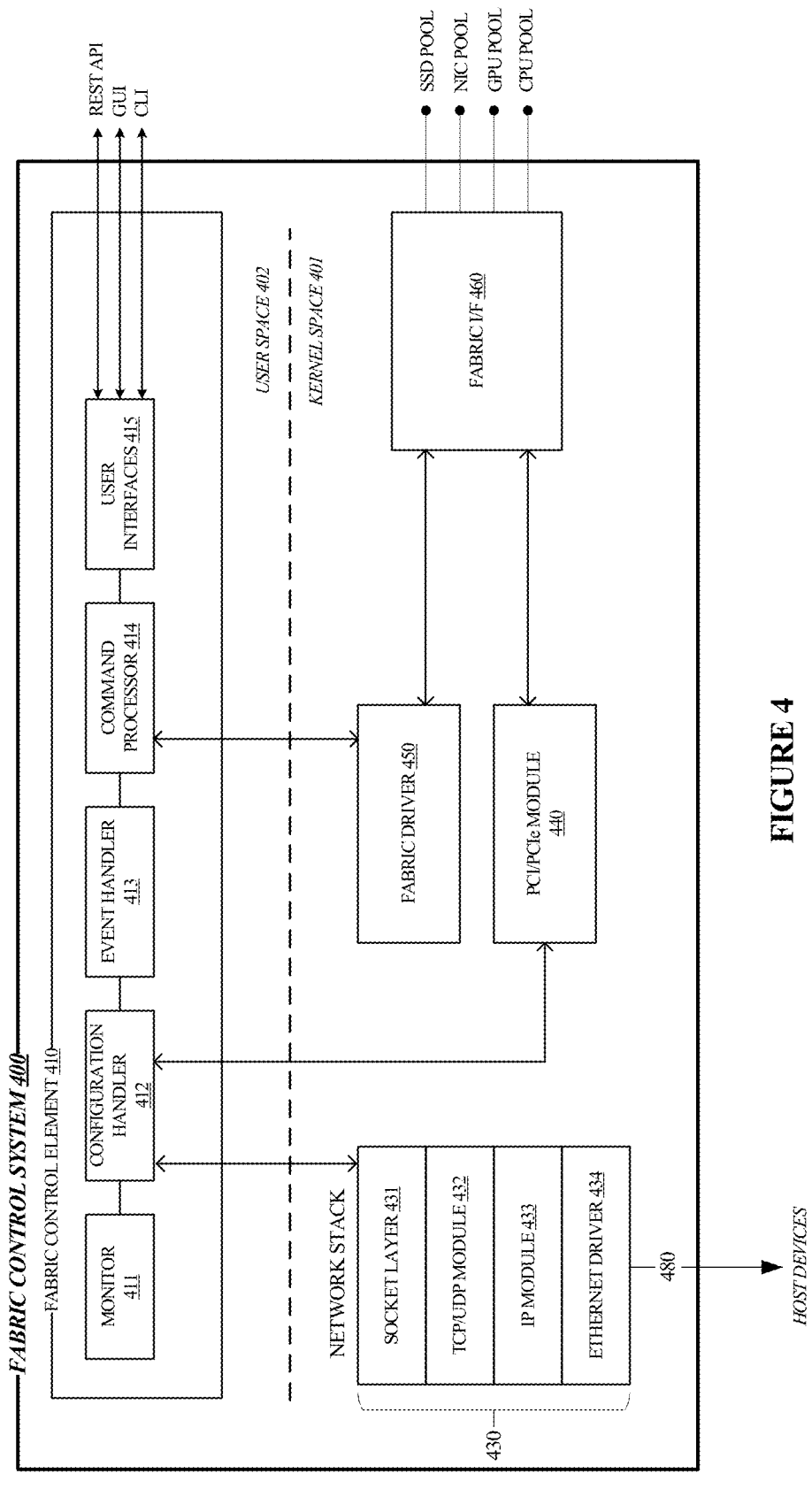
FIG. 4 is a diagram illustrating a fabric control system in an implementation.

To discuss a more detailed structure and operation of a fabric control system, FIG. 4 is presented. Although the elements of FIG. 4 can be applied to fabric control system 130 of FIG. 1, it should be understood that fabric control system 130 can employ other structures and operations. FIG. 4 includes fabric control system 400 as an example of a management node, computing device, server, computing system, blade server, or the like. Fabric control system 400 can include one or more network links, each having an associated network address. For example, a first network link 480 can couple to a network switch and then to host devices for coupling peripheral devices as discussed herein. The examples discussed regarding FIG. 4 also employ a TCP/IP style of networking for communication with fabric control system 400 and a PCIe fabric for communication with pools of peripheral devices.

Fabric control system 400 includes a user space and kernel space. Kernel space 401 is a software system that comprises core operating system (OS) elements, such as the OS kernel, device drivers, hardware interfacing subsystems, network stacks, memory management subsystems, machine clock/time modules, and other low-level elements which are employed to act as an interface between the hardware components and user applications, as well as manage resources of fabric control system 400 among user-level and kernel-level software. User space 402 includes user applications, tools, telemetry, event handlers, user interfacing elements, and other similar elements. Typically, user space elements interface with device driver elements of kernel space 401 through an application programming interface (API) or other software-defined interface to share access to the low-level hardware elements among all user software, such as network controllers, fabric interfaces, sideband communication/control interfaces, maintenance interfaces, user interface hardware, and various communication interfaces. These device driver elements receive user-level traffic and interact with hardware elements that ultimately drive link layer communications, data transfer, data processing, logic, or other low-level functions.

Within kernel space 401, fabric control system 400 includes network stack 430, PCI/PCIe module 440, fabric device driver 450, and fabric interface 460. Other kernel-space elements are omitted for clarity and to focus on the kernel-level elements relevant to the operations herein. Network stack 430 comprises a TCP/IP stack and includes various layers or modules typical of network stacks, although some elements are omitted for clarity. Ethernet driver 434 includes features of the link layer, media access controller (MAC) addressing, Ethernet frame handling, and interfaces with a network interface controller (not shown) which then handles physical layer operations and structures. IP module 433 performs packet handling, IP addressing, and internetwork operations. TCP/UDP module 432 interfaces between data structures of user applications and IP module 433, as well as packetizes user data, handles error correction and re-transmission, acknowledgement of transfers, and the like. Socket layer 431 interfaces with user applications and other components of fabric control system 400, and acts as an endpoint for packetized communications. Individual sockets can be established, each of which handles a particular communication purpose, type, protocol, or other communication segregation. Several sockets can be established by a network stack, each of which can act as an endpoint for distinct communication types. For TCP/UDP, a socket is typically identified by an IP address and a port number, and a host device can have many such port numbers for a single IP address, as well as multiple IP addresses each with their own set of port numbers. Thus, many sockets might be established, each having a particular purpose. User-level applications, user processes, or even kernel-level processes, modules, and elements can interface with the network stack through particular sockets.

PCI/PCIe module 440 comprises a PCI/PCIe subsystem which includes the equivalent of a protocol stack for PCI/PCIe links. PCI/PCIe module 440 interfaces with physical layer elements, such as fabric interface 440, and also presents a software/programming interface for configuration handler 412. Fabric device driver 450 provides a similar function as PCI/PCIe module 440, and interfaces user space elements (e.g. command processor 414) with fabric interface 412. Fabric device driver 450 provides a pathway for command and control of the fabric itself, such as for logical partitioning/isolation of peripheral devices, versus handling of traffic related to reads, writes, configuration, I/O of peripheral devices by PCI/PCIe module 440. Fabric interface 460 comprises a fabric chip or fabric switch circuitry which can provide one or more physical fabric links to couple to PCI/PCIe module 440, fabric device driver 450, and to pools of peripheral devices coupled over associated PCIe links or to further fabric chips or fabric switch circuitry that provide portions of the fabric and further fabric links.

User space 402 includes fabric control element 410 which further comprises monitor 411, configuration handler 412, event handler 413, command processor 414, and user interfaces 415. Command processor 414 communicates with fabric driver 450 to control the communication fabric(s) employed to establish logical partitioning among peripheral devices coupled to the fabric to segregate selected peripheral devices from other peripheral devices. For example, when a peripheral device is selected to be attached to a host device, command processor 414 can isolate that selected peripheral device from other peripheral devices such that a logical partition within the fabric includes the selected peripheral device to provide for routing of the communications/traffic to and from the selected peripheral device without interfering with the remainder of the peripheral devices. Once the selected peripheral device is detached, the logical isolation is removed or torn down and the peripheral device can be placed into a pool of unused devices. User interfaces 415 receive operator instructions to control the addition or removal of peripheral devices to/from host devices. User interfaces 415 can display or indicate lists of hosts and peripherals along with associated statuses or telemetry thereof. User interfaces 415 can display or indicate which peripheral devices are associated with which host devices. User interfaces 415 can display or indicate traffic histograms, logs, failures, alerts, and other various telemetry and status. User interfaces 415 can comprise terminal interfaces, application programming interfaces (APIs), representational state transfer (REST) interfaces, or RestAPIs, web interfaces, WebSocket interfaces, among other types of user interfaces including software, hardware, virtualized, or transported over various intermediary links. Event handler 413 initiates attach/detach and device discovery operations with respect to host devices. Configuration handler 412 interworks traffic between fabric-coupled peripheral devices and network-coupled host devices. Configuration handler 412 interfaces with PCI/PCIe module 440 for fabric communications and network stack 430 for network communications. Configuration handler 412 can interwork frame or packet formats, sizes, and types to transport fabric communications over network links and network communications over fabric links. Configuration handler 412 interfaces with network stack 430 through socket layer 431 through a particular socket indicated by at least an IP address and port number. Monitor 414 monitors various telemetry, operation, logs, status for fabric control system 400. Monitor 414 might maintain data structures indicating host devices and associated sockets (IP addresses and ports), as well as indicators or identities of peripheral devices. Monitor 414 can maintain logs and data structures within computer-readable media.

In operation, event handler 413 can initiate operations to discover compatible host devices coupled over network interfaces and discover peripheral devices coupled to a communication fabric. Event handler 413 can instruct command processor 414 to discover peripheral devices through fabric driver 450 and fabric interface 460. Event handler 413 can instruct configuration handler 412 to discover host devices through network stack 430. Socket information for compatible host devices can be determined and stored for later use. Fabric interface 460 scans the communication fabric to determine which peripheral devices and resources are available. Command processor 414 forms pools of free peripheral devices and indications of allocated peripheral devices, stores device/vendor ID of peripheral devices, and may store indications of PCIe addressing and buffer structures or characteristics of each peripheral device.

Requests for adding peripheral devices to host devices can be received, such as over user interfaces 415, and command processor 414 can segregate off the selected peripheral device into a logical partitioning of the communication fabric via fabric driver 450. This can trigger event handler 413 to initiate attach commands along with peripheral device information (e.g. vendor ID and device ID) to an affected host device, and this host device will then attach the peripheral device as described herein. From here, communications between the host device and the peripheral device are interworked using configuration handler 412 interpreting and exchanging traffic between socket layer 431 and PCI/PCIe module 440. At some point, the attached peripheral devices might be desired to be removed or detached from a particular host device. Event handler 413 can detect these detach events, such as received by user interfaces 415 or from host devices. Event handler 413 then issues detach commands through configuration handler 412 to detach the affected peripheral devices as discussed herein. Command processor 414 can remove the logical partitioning for the detached peripheral devices and return the detached peripheral devices to an inactive state or to the free pools of peripheral devices for later use.

FIG. 5 is a system diagram illustrating computing system 500. Computing system 500 can comprise elements of computing system 100 of FIG. 1, host device 300 of FIG. 3, or fabric control system 400 of FIG. 4, although variations are possible. Computing system 500 comprises a rackmount arrangement of multiple modular chassis. One or more physical enclosures, such as the modular chassis, can further be included in shelving or rack units. Chassis 510, 520, 530, 540, and 550 are included in computing system 500, and may be mounted in a common rackmount arrangement or span multiple rackmount arrangements in one or more data centers. Within each chassis, modules are mounted to a shared PCIe switch, along with various power systems, structural supports, and connector elements. A predetermined number of components of computing system 500 can be inserted or installed into a physical enclosure, such as a modular framework where modules can be inserted and removed according to the needs of a particular end user. An enclosed modular system can include physical support structure and enclosure that includes circuitry, printed circuit boards, semiconductor systems, and structural elements. The modules that comprise the components of computing system 500 are insertable and removable from a rackmount style of enclosure. In some examples, the elements of FIG. 5 are included in a 'U' style chassis for mounting within the larger rackmount environment. It should be understood that the components of FIG. 5 can be included in any physical mounting environment, and need not include any associated enclosures or rackmount elements.

Chassis 510 comprises a management module or top-of-rack (ToR) switch chassis and comprises management processor 511, Ethernet switch 516, and PCIe switch 560. Management processor 511 comprises management operating system (OS) 512, user interface 513, and interworking unit 514. Management processor 511 is coupled to PCIe switch 560 over one or more PCIe links comprising one or more PCIe lanes. Management processor 511 is coupled to Ethernet switch 516 over one or more network links via a network interface controller.

PCIe switch 560 is coupled over one or more PCIe links to PCIe switches 561-564 in the other chassis in computing system 500. These one or more PCIe links are represented by PCIe intermodular connections 565. PCIe switches 560-564 and PCIe intermodular connections 565 form a PCIe fabric that communicatively couples all of the various physical computing elements of FIG. 5. In some examples, management processor 511 might communicate over special management PCIe links or sideband signaling (not shown), such as inter-integrated circuit (I2C) interfaces, with elements of the PCIe fabric to control operations and partitioning of the PCIe fabric. These control operations can include composing and decomposing peripheral devices, altering logical partitioning within the PCIe fabric, monitoring telemetry of the PCIe fabric, controlling power up/down operations of modules on the PCIe fabric, updating firmware of various circuitry that comprises the PCIe fabric, and other operations.

Ethernet switch 516 includes network ports that provide switched network connections for attached devices, such as shown for network link 566. Ethernet switch 516 includes various network switching circuitry to communicatively link individual ports to other ports based on traffic patterns, addressing, or other traffic properties. In one example, Ethernet switch 516 comprises an Ethernet or Wi-Fi (802.11xx) switch hosting wired or wireless connections, which can refer to any of the various network communication protocol standards and bandwidths available, such as 10BASE-T, 100BASE-TX, 1000BASE-T, 10GBASE-T (10 GB Ethernet), 40GBASE-T (40 GB Ethernet), gigabit (GbE), terabit (TbE), 200 GbE, 400 GbE, 800 GbE, or other various wired and wireless formats and speeds.

Chassis 520 comprises a plurality of CPUs 521-525 each coupled to the PCIe fabric via PCIe switch 561 and associated PCIe links (not shown). Chassis 530 comprises a plurality of GPUs 531-535 each coupled to the PCIe fabric via PCIe switch 562 and associated PCIe links (not shown). Chassis 540 comprises a plurality of SSDs 541-545 each coupled to the PCIe fabric via PCIe switch 563 and associated PCIe links (not shown). Chassis 550 comprises a plurality of NICs 551-555 each coupled to the PCIe fabric via PCIe switch 564 and associated PCIe links (not shown). Each chassis 520, 530, 540, and 550 can include various modular bays for mounting modules that comprise the corresponding elements of each CPU, GPU, SSD, or NIC. Power systems, monitoring elements, internal/external ports, mounting/removal hardware, and other associated features can be included in each chassis. A further discussion of the individual elements of chassis 520, 530, 540, and 550 is included below. In addition to the types of components mentioned above, other component types such as FPGAs, CoPUs, RAM, memory devices, or other components can be similarly included.

Once the various CPU, GPU, SSD, or NIC components of computing system 500 have been installed into the associated chassis or enclosures, the components can be coupled over the PCIe fabric and logically isolated into any number of separate and arbitrarily defined arrangements and attached to host devices. These arrangements can be composed with selected quantities of CPUs, GPUs, SSDs, and NICs, including zero of any type of module. One example host device 501 is shown in FIG. 5, which includes an attached remote peripheral GPU 531. GPU 531 is attached to host device 501 using logical partitioning within the PCIe fabric, indicated by logical domain 570, as well as over a network link shown for link 566. The PCIe fabric can be configured by management processor 511 to selectively route traffic among the selected peripheral devices for a particular host device, while maintaining logical isolation between components not included in that particular host device. In this way, a disaggregated and flexible "bare metal" configuration can be established among the components of computing system 100. The individual peripheral devices can be arranged according to particular user identities, host device identities, execution jobs, or usage policies.

In some examples, management processor 511 may provide for attachment or detachment of peripheral devices and host devices via one or more user interfaces or job interfaces. For example, management processor 511 may provide user interface 513 which may present indications of peripheral components to be attached, indications of available host devices, as well as software and configuration information. In some examples, creation user interface may provide templates for attaching predefined arrangements of peripheral devices to host devices based on use cases or categories of usage. For example, the user interface may provide suggested templates or configurations for game server units, artificial intelligence learning compute units, data analysis units, and storage server units. For example, a game server unit or artificial intelligence processing template may specify additional graphics processing resources when compared to a storage server unit template. Further, the user interface may provide for customization of the templates or arrangement configurations and options for users to create arrangement templates from component types selected arbitrarily from lists or categories of components.

In additional examples, management processor 511 may provide for policy based dynamic adjustments to arrangements during operation. In some examples, user interface 513 can allow the user to define policies for adjustments of the peripheral devices allocated to host devices as well as adjustments to the configuration information thereof during operation. In an example, during operation, management processor 511 may analyze telemetry data to determine the utilization of the current resources by the host devices. Based on the current utilization, a dynamic adjustment policy may specify that general processing resources, graphics processing resources storage resources, networking resources, memory resources, and so on, be allocated to a host device or removed from a host device. For example, the telemetry data may show that the current usage level of the allocated storage resources of a host device is approaching a threshold level and allocate an additional storage device to the host device.

Although a PCIe fabric is discussed in the context of FIG. 5, management processor 511 may provide for control and management of multiple protocol communication fabrics and different communication fabrics than PCIe. For example, management processor 511 and the PCIe switch devices of the PCIe fabric may provide for communicative coupling of physical components using multiple different implementations or versions of PCIe and similar protocols. For example, different PCIe versions (e.g. 3.0, 4.0, 5.0, and later) might be employed for different physical components in the same PCIe fabric. Further, next-generation interfaces can be employed, such as Gen-Z, CCIX, CXL, OpenCAPI, or wireless interfaces including Wi-Fi interfaces or cellular wireless interfaces. Also, although PCIe is used in FIG. 5, it should be understood that PCIe may be absent and different communication links or busses can instead be employed, such as NVMe, Ethernet, SAS, FibreChannel, Thunderbolt, SATA Express, among other interconnect, network, and link interfaces.

Turning now to a discussion on the components of computing system 500, management processor 511 can comprise one or more microprocessors and other processing circuitry that retrieves and executes software, such as management operating system 512, user interface 513, and interworking unit 514, from an associated storage system. Management processor 511 can be implemented within a single processing device but can also be distributed across multiple processing devices or sub-systems that cooperate in executing program instructions. Examples of management processor 511 include general purpose central processing units, application specific processors, and logic devices, as well as any other type of processing device, combinations, or variations thereof. In some examples, management processor 511 comprises an Intel® or AMD® microprocessor, Apple® microprocessor, ARM® microprocessor, field-programmable gate array (FPGA), application specific integrated circuit (ASIC), application specific processor, or other microprocessor or processing elements.

Management operating system (OS) 512 is executed by management processor 511 and provides for management of resources of computing system 500 and for execution of user interface 513 and interworking unit 514. Management OS 512 provides for the functionality and operations described herein for management processor 511, specifically, for user interface 513 and interworking unit 514.

User interface 513 can present graphical user interfaces (GUIs), Application Programming Interfaces (APIs), representational state transfer (REST) interfaces, RestAPIs, or command line interfaces (CLIs), WebSocket interfaces, to one or more users. User interface 513 can be employed by end users or administrators to configure host devices and peripheral devices, establish arrangements of host devices and peripheral devices, receive status, telemetry, and other notifications regarding operation of host devices and peripheral devices, and perform other operations. User interface 513 can be employed to manage, select, and alter templates. User interface 513 can be employed to manage, select, and alter policies. User interface 513 also can provide telemetry information for the operation of computing system 500 to users, such as in one or more status interfaces or status views. The state of various components or elements of computing system 500 can be monitored through user interface 513, such as CPU states, GPU states, NIC states, SSD states, Ethernet states, PCIe switch/fabric states, among others. Various performance metrics, error statuses can be monitored using user interface 513.

Interworking unit 514 provides for various network-to-fabric interworking features and operations discussed herein, along with discovery, attachment, and de-attachment of peripheral devices with regard to host devices. Specifically, interworking unit 514 discovers peripheral devices from among the CPUs, GPUs, SSDs, NICs, and other devices within computing system 500 coupled over a communication fabric (e.g. 565) and catalogs these devices within one or more data structures noted by example data structure 592. Interworking unit 514 also discovers host devices coupled over network links (e.g. 566) and catalogs these devices within one or more data structures noted by example data structure 591. The cataloging can include noting device identifiers, vendor identifiers, addresses, ports, sockets, or other properties. Interworking unit 514 can receive operator instructions via user interface 513 of from host devices to establish arrangements between host devices and one or more peripheral devices. The instructions can identify which host devices and which peripheral devices or which type of peripheral devices are to be coupled. Responsive to the instructions, interworking unit 514 initiates attachment of the peripheral devices into host devices, such as by issuing one or more attach commands to PoF units of the host devices. This attach instruction alerts the PoF units of the host devices to initiate instantiation of the peripheral devices into local peripheral interconnect interfaces of the host devices by at least emulating behavior of the peripheral devices coupled over network interfaces as local peripheral devices coupled to the peripheral interconnect interfaces of the host systems. Interworking unit 514 can then interwork traffic originated by peripheral devices on the communication fabric and carried on 565 with network link 566, and interwork traffic originated by host systems and carried on network link 566 with fabric communications over link 565. Interworking unit 514 can receive instructions to detach peripheral devices from host devices, and issue detach commands to PoF units of the host devices. Once detached, the peripheral devices can be placed back into a pool of free devices for later usage by other host devices.

One example attachment operation is shown in FIG. 5. An instruction can be received to attach GPU 531 to host device 501, and interworking unit can provide an attach command and identifiers of GPU 531 to host device 501 over a corresponding network link. Table 591 shows a target host device identifier of 001234 having an IP address of 10.10.10.1 and (not shown) corresponding socket corresponding to a port number. Table 592 shows GPU 531 having a vendor ID and device ID which are provided to the target host device for attachment. A logical isolation for GPU 531 can be established between GPU 531 and management processor 511 in the communication fabric to allow for communications of the target host device to be properly exchanged with GPU 531 over the communication fabric without interference with other peripheral devices and host devices. This arrangement can be referred to as logical domain 570 which includes elements of the Ethernet links (e.g. 566), communication fabric links, fabric switch circuitry, and GPU 531. Communications of GPU 531 can be directed over a PCIe link to the target host device using the socket corresponding to host device 501, namely the IP address of 10.10.10.1 and associated port number. Communications of host device 501 can be directed over a network link to GPU 531 using the device ID and vendor ID of GPU 531, as intercepted and interpreted by interworking unit 514.

More than one instance of elements 511-514 can be included in computing system 500. User commands, such as those received over a GUI, can be received into any of the management instances and forwarded by the receiving management instance to the handling management instance. Each management instance can have a unique or pre-assigned identifier which can aid in delivery of user commands to the proper management instance. Additionally, management processors of each management instance can communicate with each other, such as using a mailbox process or other data exchange technique. This communication can occur over dedicated sideband interfaces, such as I2C interfaces, or can occur over PCIe or Ethernet interfaces that couple each management processor.

A plurality of CPUs 521-525 are included in chassis 520. Each CPU may comprise a CPU module that includes one or more CPUs or microprocessors and other processing circuitry that retrieves and executes software, such as operating systems, device drivers, and applications, from an associated storage system. Each CPU can be implemented within a single processing device but can also be distributed across multiple processing devices or sub-systems that cooperate in executing program instructions. Examples of each CPU include general purpose central processing units, application specific processors, and logic devices, as well as any other type of processing device, combinations, or variations thereof. In some examples, each CPU comprises an Intel® microprocessor, Apple® microprocessor, AMD® microprocessor, ARM® microprocessor, graphics processor, compute cores, graphics cores, ASIC, FPGA, or other microprocessor or processing elements. Each CPU can also communicate with other CPUs, such as those in a same storage assembly/enclosure or another storage assembly/enclosure over one or more PCIe interfaces and PCIe fabrics.

A plurality of GPUs 531-535 are included in chassis 530, which may represent any type of CoCPU. Each GPU may comprise a GPU module that includes one or more GPUs. Each GPU includes graphics processing resources that can be allocated to one or more host devices. The GPUs can comprise graphics processors, shaders, pixel render elements, frame buffers, texture mappers, graphics cores, graphics pipelines, graphics memory, or other graphics processing and handling elements. In some examples, each GPU comprises a graphics 'card' comprising circuitry that supports a GPU chip. Example GPU cards include nVIDIA® or AMD® graphics cards that include graphics processing elements along with various support circuitry, connectors, and other elements. In further examples, other style of graphics processing units, graphics processing assemblies, or co-processing elements can be employed, such as machine learning processing units, tensor processing units (TPUs), FPGAs, ASICs, or other specialized processors that may include specialized processing elements to focus processing and memory resources on processing of specialized sets of data.

A plurality of SSDs 541-545 are included in chassis 540. Each SSD may comprise an SSD module that includes one or more SSD. Each SSD includes one or more storage drives, such as solid-state storage drives with a PCIe interface. Each SSD also includes PCIe interfaces, control processors, and power system elements. Each SSD may include a processor or control system for traffic statistics and status monitoring, among other operations. In yet other examples, each SSD instead comprises different data storage media, such as magnetic hard disk drives (HDDs), crosspoint memory (e.g. Optane® devices), static random-access memory (SRAM) devices, programmable read-only memory (PROM) devices, or other magnetic, optical, or semiconductor-based storage media, along with associated enclosures, control systems, power systems, and interface circuitry.

A plurality of NICs 551-555 are included in chassis 550, each having an associated MAC address or Ethernet address. Each NIC may comprise a NIC module that includes one or more NIC. Each NIC may include network interface controller cards for communicating over TCP/IP (Transmission Control Protocol (TCP)/Internet Protocol) networks or for carrying user traffic, such as iSCSI (Internet Small Computer System Interface) or NVMe (NVM Express) traffic for elements of an associated host device. NICs can comprise Ethernet interface equipment, and can communicate over wired, optical, or wireless links. External access to components of computing system 500 can be provided over packet network links provided by the NICs. NICs might communicate with other components of an associated host device over associated PCIe links of the PCIe fabric. In some examples, NICs are provided for communicating over Ethernet links with management processor 511. In additional examples, NICs are provided for communicating over Ethernet links with one or more other chassis, rackmount systems, data centers, computing platforms, communication fabrics, or other elements.

Other specialized devices might be employed in computing platform in addition to CPUs, GPUs, SSDs, and NICs. These other specialized devices can include co-processing modules comprising specialized co-processing circuitry, fabric-coupled RAM devices, ASIC circuitry, or FPGA circuitry, as well as various memory components, storage components, and interfacing components, among other circuitry. The other specialized devices can each include a PCIe interface comprising one or more PCIe lanes. These PCIe interfaces can be employed to communicate over the PCIe fabric and for inclusion of the other specialized devices in one or more host devices. These other specialized devices might comprise PCIe endpoint devices or PCIe host devices which may or may not have a root complex.

FPGA devices can be employed as one example of the other specialized devices. FPGA devices can receive processing tasks from another PCIe device, such as a CPU or GPU, to offload those processing tasks into the FPGA programmable logic circuitry. An FPGA is typically initialized into a programmed state using configuration data, and this programmed state includes various logic arrangements, memory circuitry, registers, processing cores, specialized circuitry, and other features which provide for specialized or application-specific circuitry. FPGA devices can be re-programmed to change the circuitry implemented therein, as well as to perform a different set of processing tasks at different points in time. FPGA devices can be employed to perform machine learning tasks, implement artificial neural network circuitry, implement custom interfacing or glue logic, perform encryption/decryption tasks, perform block chain calculations and processing tasks, or other tasks. In some examples, a CPU will provide data to be processed by the FPGA over a PCIe interface to the FPGA. The FPGA can process this data to produce a result and provide this result over the PCIe interface to the CPU. More than one CPU and/or FPGA might be involved to parallelize tasks over more than one device or to serially process data through more than one device. In some examples, an FPGA arrangement can include locally-stored configuration data which may be supplemented, replaced, or overridden using configuration data stored in the configuration data storage. This configuration data can comprise firmware, programmable logic programs, bitstreams, or objects, PCIe device initial configuration data, among other configuration data discussed herein. FPGA arrangements can also include SRAM devices or PROM devices used to perform boot programming, power-on configuration, or other functions to establish an initial configuration for the FPGA device. In some examples, the SRAM or PROM devices can be incorporated into FPGA circuitry or packaging.

PCIe switches 560-564 communicate over associated PCIe links. In the example in FIG. 5, PCIe switches 560-564 can be used for carrying traffic between PCIe devices within each chassis and between each chassis. Each PCIe switch 560-564 comprises a PCIe cross connect switch for establishing switched connections between any PCIe interfaces handled by each PCIe switch. The PCIe switches discussed herein can logically interconnect various ones of the associated PCIe links based at least on the traffic carried by each PCIe link. In these examples, a domain-based PCIe signaling distribution can be included which allows segregation of PCIe ports of a PCIe switch according to user-defined groups. The user-defined groups can be managed by management processor 511 which logically integrates components into associated logical units and logically isolates components and logical units from among each other. In addition to, or alternatively from the domain-based segregation, each PCIe switch port can be a non-transparent (NT) or transparent port. An NT port can allow some logical isolation between endpoints, much like a bridge, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port.

Advantageously, this NT port-based segregation or domain-based segregation can allow physical components (i.e. CPU, GPU, SSD, NIC) only to have visibility to those components that are included via the segregation/partitioning. Thus, groupings among a plurality of physical components can be achieved using logical partitioning among the PCIe fabric. This partitioning is scalable in nature, and can be dynamically altered as-needed by management processor 511 or other control elements. Management processor 511 can control PCIe switch circuitry that comprises the PCIe fabric to alter the logical partitioning or segregation among PCIe ports and thus alter composition of groupings of the physical components. These groupings can individually form compute units and can be further grouped into clusters of many compute units/machines, all attached to various host devices. Physical components can be added to or removed from compute units according to user instructions received over a user interface, dynamically in response to loading/idle conditions, dynamically in response to incoming or queued execution jobs, or preemptively due to anticipated need, among other considerations discussed herein.

In further examples, memory mapped direct memory access (DMA) conduits can be formed between individual CPU/PCIe device pairs. This memory mapping can occur over the PCIe fabric address space, among other configurations. To provide these DMA conduits over a shared PCIe fabric comprising many CPUs and GPUs, the logical partitioning described herein can be employed. Specifically, NT ports or domain-based partitioning on PCIe switches can isolate individual DMA conduits among the associated CPUs/GPUs. The PCIe fabric may have a 64-bit address space, which allows an addressable space of 264 bytes, leading to at least 16 exbibytes of byte-addressable memory. The 64-bit PCIe address space can be shared by all compute units or segregated among various compute units forming arrangements for appropriate memory mapping to resources.

PCIe interfaces can support multiple bus widths, such as x1, x2, x4, x8, x16, and x32, with each multiple of bus width comprising an additional "lane" for data transfer. PCIe also supports transfer of sideband signaling, such as System Management Bus (SMBus) interfaces and Joint Test Action Group (JTAG) interfaces, as well as associated clocks, power, and bootstrapping, among other signaling. PCIe also might have different implementations or versions employed herein. For example, PCIe version 3.0 or later (e.g. 4.0, 5.0, or later) might be employed. Moreover, next-generation interfaces can be employed, such as Gen-Z, Cache Coherent CCIX, CXL, or OpenCAPI. Also, although PCIe is used in FIG. 5, it should be understood that different communication links or busses can instead be employed, such as NVMe, Ethernet, SAS, FibreChannel, Thunderbolt, SATA Express, among other interconnect, network, and link interfaces. NVMe is an interface standard for mass storage devices, such as hard disk drives and solid-state memory devices. NVMe can supplant SATA interfaces for interfacing with mass storage devices in personal computers and server environments. However, these NVMe interfaces are limited to one-to-one host-drive relationship, similar to SATA devices. In the examples discussed herein, a PCIe interface can be employed to transport NVMe traffic and present a multi-drive system comprising many storage drives as one or more NVMe virtual logical unit numbers (VLUNs) over a PCIe interface.

Any of the links in FIG. 5 can each use various communication media, such as air, space, metal, optical fiber, or some other signal propagation path, including combinations thereof. Any of the PCIe links in FIG. 5 can include any number of composite PCIe links or single/multi-lane configurations. Any of the links in FIG. 5 can each be a direct link or might include various equipment, intermediate components, systems, and networks. Any of the links in FIG. 5 can each be a common link, shared link, aggregated link, or may be comprised of discrete, separate links.

The discussion now turns to brief examples of compute unit formation and attachment to host devices. In FIG. 5, configurable logical visibility can be provided to host devices to any/all CPUs 521-525, GPUs 531-535, SSDs 541-545, and NICs 551-555, or other physical components coupled to the PCIe fabric of computing system 500, as segregated logically by the PCIe fabric. For example, any CPU 521-525 can transfer and retrieve storage data with any SSD 541-545 that is included in the same compute unit. Likewise, any CPU 521-525 can exchange data for processing by any GPU 531-535 included in the same compute unit. Thus, 'm' number of SSDs or GPUs can be coupled with 'n' number of CPUs to allow for a large, scalable architecture with a high-level of performance, redundancy, and density. In graphics processing examples, NT partitioning or domain-based partitioning in the PCIe fabric can be provided by one or more of the PCIe switches. This partitioning can ensure that GPUs can be interworked with a desired CPU or CPUs and that more than one GPU, such as eight (8) GPUs, can be associated with a particular compute unit. Moreover, dynamic GPU-compute unit relationships can be adjusted on-the-fly using partitioning across the PCIe fabric. Shared NIC resources can also be applied across compute units.

Figure 6:
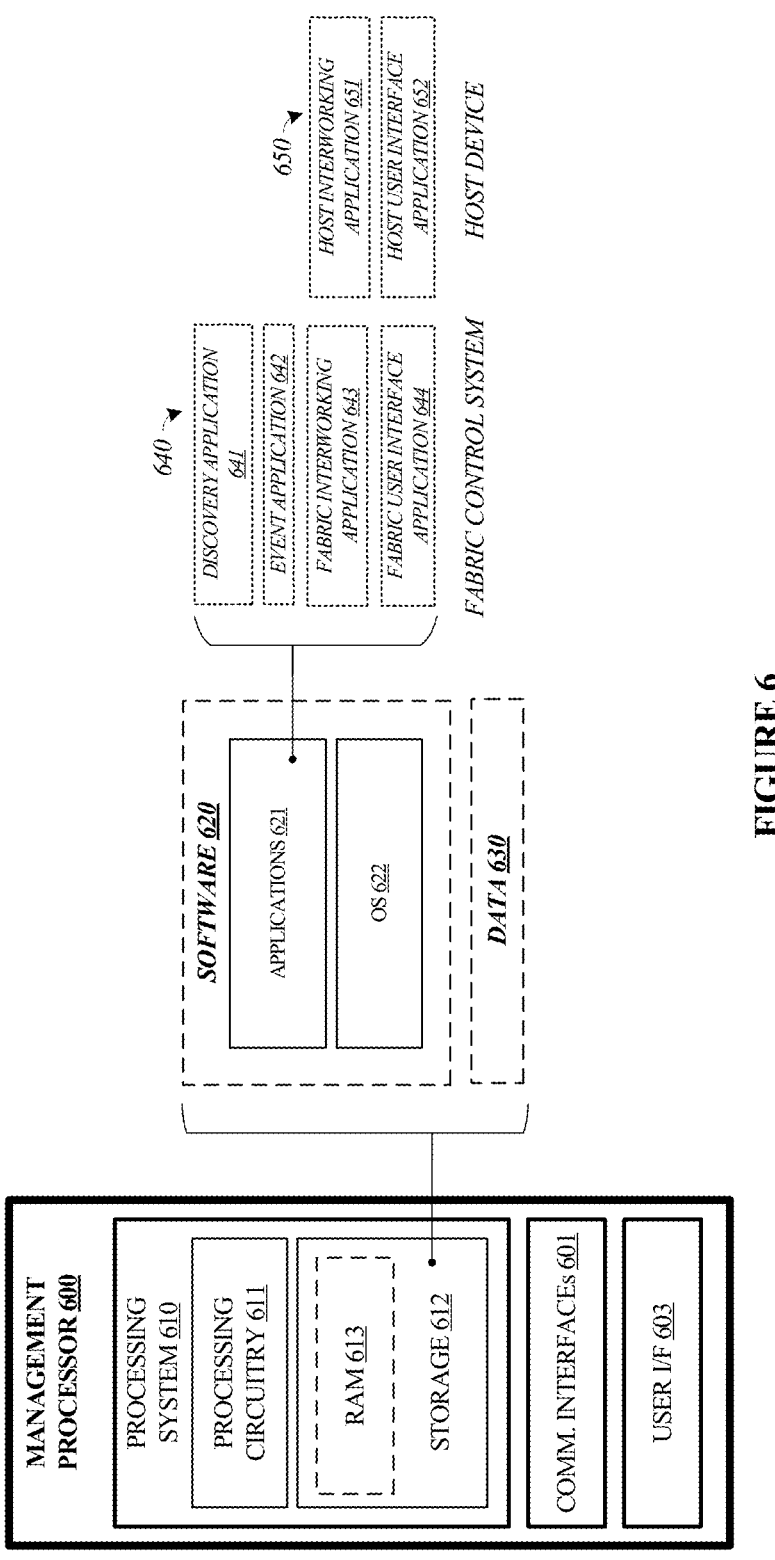
FIG. 6 is a diagram illustrating a control system in an implementation.

FIG. 6 is a block diagram illustrating an implementation of management processor 600. Management processor 600 illustrates an example of any of the control elements, control systems, interworking units, PoF units, fabric control elements, or management processors discussed herein, such as PoF system 115 of FIG. 1, fabric control system 130 of FIG. 1, PoF unit 320 of FIG. 3, fabric control element 410 of FIG. 4, or management processor 511 of FIG. 5. Management processor 600 includes communication interfaces 601, user interface 603, and processing system 610. Processing system 610 includes processing circuitry 611 and data storage system 612 which can include random access memory (RAM) 613, although additional or different configurations of elements can be included.

Processing system 610 is generally intended to represent a computing system with which at least software 620 is deployed and executed in order to render or otherwise implement the operations described herein. However, processing system 610 can also represent any computing system on which at least software 620 and data 630 can be staged and from where software 620 and data 630 can be distributed, transported, downloaded, or otherwise provided to yet another computing system for deployment and execution, or yet additional distribution. Processing circuitry 611 can be implemented within a single processing device but can also be distributed across multiple processing devices or subsystems that cooperate in executing program instructions. Examples of processing circuitry 611 include general purpose central processing units, microprocessors, application specific processors, and logic devices, as well as any other type of processing device. In some examples, processing circuitry 611 includes physically distributed processing devices, such as cloud computing systems.

Communication interfaces 601 include one or more communication fabric and/or network interfaces for communicating over PCIe links, networks, such as packet networks, the Internet, and the like. The communication interfaces can include PCIe interfaces, Ethernet interfaces, serial interfaces, serial peripheral interface (SPI) links, inter-integrated circuit (I2C) interfaces, universal serial bus (USB) interfaces, UART interfaces, wireless interfaces, or one or more local or wide area network communication interfaces which can communicate over Ethernet or Internet protocol (IP) links. Communication interfaces 601 can include network interfaces configured to communicate using one or more network addresses, which can be associated with different network links. Examples of communication interfaces 601 include network interface controller equipment, transceivers, modems, and other communication circuitry. Communication interfaces 601 can communicate with control elements of a PCIe fabric or other communication fabric to establish logical partitioning within the fabric, such as over an administrative or control interface of one or more communication switches of the communication fabric. Communication interfaces 601 can communicate over a PCIe fabric to exchange traffic/communications with peripheral devices.

User interface 603 may include a software-based interfaces or hardware-based interfaces. Hardware-based interfaces include touchscreen, keyboard, mouse, voice input device, audio input device, or other touch input device for receiving input from a user. Output devices such as a display, speakers, web interfaces, terminal interfaces, and other types of output devices may also be included in user interface 603. User interface 603 can provide output and receive input over a network interface, such as communication interfaces 601. In network examples, user interface 603 might packetize display or graphics data for remote display by a display system or computing system coupled over one or more network interfaces. Physical or logical elements of user interface 603 can provide alerts or visual outputs to users or other operators. User interface 603 may also include associated user interface software executable by processing system 610 in support of the various user input and output devices discussed above. Separately or in conjunction with each other and other hardware and software elements, the user interface software and user interface devices may support a graphical user interface, a natural user interface, or any other type of user interface.

User interface 603 can present command line interfaces (CLIs), application programming interfaces (APIs), graphical user interfaces (GUIs), representational state transfer (REST) interfaces, RestAPIs, WebSocket interfaces, or other interfaces to one or more users. The user interfaces can be employed by operators or administrators to assign assets (compute units/peripherals) to each host device. In some examples, the user interfaces provide an interface to allow an end user to determine one or more templates and dynamic adjustment policy sets to use or customize for use in creation of compute units. User interface 603 can be employed to manage, select, and alter machine templates or alter policies.

User interface 603 also can provide telemetry information, such as in one or more status interfaces or status views. The state of various components or elements can be monitored through user interface 603, such as processor state, network state, storage unit state, PCIe element state, among others. Various performance metrics, error statuses can be monitored using user interface 603.

Storage system 612 and RAM 613 together can comprise a non-transitory data storage system, although variations are possible. Storage system 612 and RAM 613 can each comprise any storage media readable by processing circuitry 611 and capable of storing software and OS images. RAM 613 can include volatile and nonvolatile, removable and non-removable media implemented in any method or technology for storage of information, such as computer readable instructions, data structures, program modules, or other data. Storage system 612 can include non-volatile storage media, such as solid-state storage media, flash memory, NAND flash or NOR flash, phase change memory, magnetic memory, or other non-transitory storage media, including combinations thereof. Storage system 612 and RAM 613 can each be implemented as a single storage device but can also be implemented across multiple storage devices or sub-systems. Storage system 612 and RAM 613 can each comprise additional elements, such as controllers, capable of communicating with processing circuitry 611.

Software 620 or data 630 can be stored on or in storage system 612 or RAM 613 can comprise computer program instructions, firmware, data structures, or some other form of machine-readable processing instructions having processes that when executed a processing system direct processor 600 to operate as described herein. Software 620 can reside in RAM 613 during execution and operation of processor 600, and can reside in non-volatile portions of storage system 612 during a powered-off state, among other locations and states. Software 620 can be loaded into RAM 613 during a startup or boot procedure as described for computer operating systems and applications. Software 620 can receive user input through user interface 603. This user input can include user commands, as well as other input, including combinations thereof.

Software 620 includes applications 621 and operating system (OS) 622. Software 620 can drive processor 600 to receive user commands to attach or detach peripheral devices to/from host devices. Software 620 can drive processor 600 to receive and monitor telemetry data, statistical information, operational data, and other data to provide telemetry to users and alter operation according to the telemetry data, policies, or other data and criteria. Software 620 can drive processor 600 to manage peripheral device resources and host device resources, establish domain partitioning or NT partitioning among communication fabric elements, and interface with individual communication switches to control operation of such communication switches, among other operations. The software can also include user software applications, application programming interfaces (APIs), or user interfaces. The software can be implemented as a single application or as multiple applications. In general, the software can, when loaded into a processing system and executed, transform the processing system from a general-purpose device into a special-purpose device customized as described herein.

Software applications 621 might take different forms depending upon the operations and devices implemented by management processor 600. For example, when management processor 600 operates a fabric control system, then application set 640 can be deployed comprising discovery application 641, event application 642, fabric interworking application 643, and fabric user interface application 644. Alternatively, when management processor operates a host device, then application set 650 can be deployed comprising host interworking application 651 and host user interface application 652. Software applications 623-629 each comprise executable instructions which can be executed by processor 600 for operating a computing system or processing circuitry according to the operations discussed herein.

Application set 640 includes discovery application 641, event application 642, fabric interworking application 643, and fabric user interface application 644. Discovery application 641 obtains an indication of a peripheral device available for associating with a host device, where the indication of the peripheral device comprises a device identifier and vendor identifier. Discovery application 641 obtains an indication of a host device over a network interface available for associated with a peripheral device. Discovery application 641 can store these indications within data 630. Based on the indications, event application 642 initiates instantiation and de-instantiation of a peripheral device into a local peripheral interconnect interface of a host device. Fabric interworking application 643 intercepts host originated traffic for a peripheral device received over a network interface, interprets the host originated traffic to convert from a network format into a fabric format suitable for transfer over a communication fabric, and routes the host originated traffic in the fabric format over a fabric interface for delivery to the peripheral device. Fabric interworking application 643 intercepts peripheral originated traffic for a host device received over a fabric interface, interprets the peripheral originated traffic to convert from a fabric format into a network format suitable for transfer over a network link, and routes the peripheral originated traffic in the network format over a network interface for delivery to the host device. Fabric user interface application 644 can receive operator instructions to attach or detach peripheral devices with respect to host devices, and can present various information, status, telemetry, logs, and the like to operations over various types of user interfaces.

Application set 650 includes host interworking application 651 and host user interface application 652. Host interworking application 561 emulates behavior of peripheral devices coupled over a network interface as a local peripheral device coupled to a peripheral interconnect interface of a host system. Host interworking application 561 emulates the hardware plugging process by at least providing address space descriptions to the local peripheral interconnect interface to access the peripheral device as the local peripheral device coupled to the host system. Host interworking application 561 removes instantiation of the peripheral devices from the local peripheral interconnect interface by at least emulating a hardware removal process in the local peripheral interconnect interface. Host interworking application 561 interfacing with a network stack of the host device to interwork traffic of the peripheral devices with the local peripheral interconnect interface. Once instantiated into the local peripheral interconnect interface of the host device, a device driver of the host device can interface with the peripheral device through the local peripheral interconnect interface. Host interworking application 561 emulates the behavior of peripheral devices by at least intercepting host originated traffic for the peripheral device from the local peripheral interconnect interface, interpreting the host originated traffic to convert from a native peripheral format (such as PCIe frames or memory-mapped formats) into a network format suitable for transfer over the network interface, and routing the host originated traffic in the packet format over the network interface for delivery to the peripheral devices. Host interworking application 561 emulates the behavior of the peripheral devices by at least receiving peripheral device originated traffic in a packet format from the network interface, and interpreting the peripheral device originated traffic in the packet format to convert to a native peripheral format suitable for the local peripheral interconnect interface. Host interworking application 561 initiates instantiation of the peripheral device into a local peripheral interconnect interface by at least triggering an entry point process in the local peripheral interconnect interface to emulate a hardware plugging process for the peripheral device with the local peripheral interconnect interface. Host user interface application 652 can provide local indications of attachments and de-attachments of peripheral devices to operators of host devices, and can receive operator instructions to attach or detach peripheral devices, among other operations.

In addition to software 620, other data 630 comprising various data structures can be stored by storage system 612 and RAM 613. Data 630 can comprise templates, policies, telemetry data, event logs, or fabric status. Data 630 can include indications and identities of peripheral devices and host devices. Data 630 can include present assignments of peripheral devices to host devices. Fabric status includes information and properties of the various communication fabrics that comprise a pool of resources or pool of components, such as fabric type, protocol version, technology descriptors, header requirements, addressing information, and other data. Fabric data might include relations between components and the specific fabrics through which the components connect.

Discussed herein are various peripheral devices including data processing elements or other computing components coupled over one or more communication fabrics or communication networks. Various communication fabric types or communication network types might be employed herein. For example, a Peripheral Component Interconnect Express (PCIe) fabric can be employed to couple to CoPUs, which might comprise various versions, such as 3.0, 4.0, or 5.0, among others. Instead of a PCIe fabric, other point-to-point communication fabrics or communication buses with associated physical layers, electrical signaling, protocols, and layered communication stacks can be employed. These might include Gen-Z, Ethernet, InfiniBand, NVMe, Internet Protocol (IP), Serial Attached SCSI (SAS), FibreChannel, Thunderbolt, Serial Attached ATA Express (SATA Express), NVLink, Cache Coherent Interconnect for Accelerators (CCIX), Compute Express Link (CXL), Open Coherent Accelerator Processor Interface (OpenCAPI), Wi-Fi (802.11x), or cellular wireless technologies, among others. Communication networks can couple to host systems and include Ethernet or Wi-Fi (802.11x), which can refer to any of the various network communication protocol standards and bandwidths available, such as 10BASE-T, 100BASE-TX, 1000BASE-T, 10GBASE-T (10 GB Ethernet), 40GBASE-T (40 GB Ethernet), gigabit (GbE), terabit (TbE), 200 GbE, 400 GbE, 800 GbE, or other various wired and wireless Ethernet formats and speeds. Cellular wireless technologies might include various wireless protocols and networks built around the 3rd Generation Partnership Project (3GPP) standards including 4G Long-Term Evolution (LTE), 5G NR (New Radio) and related 5G standards, among others.

Some of the aforementioned signaling or protocol types are built upon PCIe, and thus add additional features to PCIe interfaces. Parallel, serial, or combined parallel/serial types of interfaces can also apply to the examples herein. Although many of the examples herein employ PCIe as the exemplary fabric type for coupling to peripheral devices, it should be understood that others can instead be used. PCIe is a high-speed serial computer expansion bus standard, and typically has multi-lane point-to-point connections among hosts and component devices, or among peer devices. PCIe typically has multi-lane serial links connecting individual devices to a root complex. A PCIe communication fabric can be established using various switching circuitry and control architectures described herein.

The components of the various computing systems herein can be included in one or more physical enclosures, such as rack-mountable modules which can further be included in shelving or rack units. A quantity of components can be inserted or installed into a physical enclosure, such as a modular framework where modules can be inserted and removed according to the needs of a particular end user. An enclosed modular system can include physical support structure and enclosure that includes circuitry, printed circuit boards, semiconductor systems, and structural elements. The modules that comprise the components may be insertable and removable from a rackmount style or rack unit (U) type of enclosure. It should be understood that the components herein can be included in any physical mounting environment, and need not include any associated enclosures or rackmount elements.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the present disclosure. Those skilled in the art will also appreciate that the features described above can be combined in various ways to form multiple implementations. As a result, the invention is not limited to the specific implementations described above, but only by the claims and their equivalents.

What is claimed is:

1. A method comprising:

obtaining traffic for a peripheral device issued by a device driver to a local peripheral interconnect interface of a host device;

translating the traffic into a network packet format suitable for a network interface of the host device comprising a header having an identifier for the peripheral device, wherein the identifier for the peripheral device comprises a device-specific network port and address which is included in the header; and transferring the traffic in the network packet format for delivery to the peripheral device over the network interface.

2. The method of claim 1, comprising:
receiving additional traffic issued by the peripheral device and received over the network interface;
translating the additional traffic into translated additional traffic comprising a peripheral format suitable for the local peripheral interconnect interface of the host device; and
emulating the peripheral device as a locally coupled device to the local peripheral interconnect interface by at least providing the translated additional traffic over the local peripheral interconnect interface to reach the device driver.

3. The method of claim 2, comprising:
translating the additional traffic into the peripheral format suitable for the local peripheral interconnect interface of the host device by at least interpreting a network packet format used by the network interface and converting the additional traffic into the translated additional traffic in the peripheral format used by the local peripheral interconnect interface to communicate with local peripheral devices.

4. The method of claim 1, comprising:
initiating instantiation of the peripheral device into the local peripheral interconnect interface of the host device, wherein once instantiated, the device driver for the local peripheral interconnect interface interfaces with the peripheral device coupled over the network interface in a native format corresponding to the local peripheral interconnect interface.

5. The method of claim 1, comprising:
translating the traffic into the network packet format suitable for the network interface of the host device by at least interpreting a peripheral format used by the local peripheral interconnect interface to communicate with local peripheral devices of the host system and converting the traffic in the peripheral format into the translated traffic in the network packet format.

6. The method of claim 5, wherein
the peripheral format corresponds to a peripheral component interconnect express (PCIe) datagram format employed for local peripheral devices of the host device; and
wherein the network packet format comprises Ethernet frames or Internet Protocol (IP) packets.

7. The method of claim 1, comprising:
initiating instantiation of the peripheral device into the local peripheral interconnect interface by at least triggering an entry point process for the peripheral device in the local peripheral interconnect interface to emulate a hardware hot-plugging process for the peripheral device with the local peripheral interconnect interface.

8. The method of claim 7, wherein emulating the hardware plugging process comprises providing address space descriptions to the local peripheral interconnect interface to access the peripheral device as a local peripheral device.

9. The method of claim 1, comprising:
removing instantiation of the peripheral device from the local peripheral interconnect interface by at least emulating a device unplug process for the peripheral device in the local peripheral interconnect interface.

10. The method of claim 1, wherein emulating the hardware removal process comprises issuing a detach command to the local peripheral interconnect interface for the peripheral device and deconstructing the address space descriptions associated with the peripheral device.

11. An apparatus, comprising:
program instructions stored on one or more non-transitory computer readable storage media, the program instructions executable by a processing system to direct the processing system to at least:
obtain traffic for a peripheral device issued by a device driver to a local peripheral interconnect interface of a host device;
translate the traffic into a network packet format suitable for a network interface of the host device comprising a header having an identifier for the peripheral device, wherein the identifier for the peripheral device comprises a device-specific network port and address which is included in the header; and
transfer the traffic in the network packet format for delivery to the peripheral device over the network interface.

12. The apparatus of claim 11, comprising program instructions stored on the one or more non-transitory computer readable storage media, the program instructions executable by the processing system to direct the processing system to at least:
receive additional traffic issued by the peripheral device and received over the network interface;
translate the additional traffic into translated additional traffic comprising a peripheral format suitable for the local peripheral interconnect interface of the host device; and
emulate the peripheral device as a locally coupled device to the local peripheral interconnect interface by at least providing the translated additional traffic over the local peripheral interconnect interface to reach the device driver.

13. The apparatus of claim 12,
comprising program instructions stored on the one or more non-transitory computer readable storage media, the program instructions executable by the processing system to direct the processing system to at least:
translate the additional traffic into the peripheral format suitable for the local peripheral interconnect interface of the host device by at least interpreting a network packet format used by the network interface and converting the additional traffic into the translated additional traffic in the peripheral format used by the local peripheral interconnect interface to communicate with local peripheral devices.

14. The apparatus of claim 11, comprising program instructions stored on the one or more non-transitory computer readable storage media, the program instructions executable by the processing system to direct the processing system to at least:
initiate instantiation of the peripheral device into the local peripheral interconnect interface of the host device, wherein once instantiated, the device driver for the local peripheral interconnect interface interfaces with the peripheral device coupled over the network interface in a native format corresponding to the local peripheral interconnect interface.

15. The apparatus of claim 11, comprising program instructions stored on the one or more non-transitory computer readable storage media, the program instructions executable by the processing system to at least:
translate the traffic into the network packet format by at least interpreting a peripheral format used by the local peripheral interconnect interface to communicate with local peripheral devices and converting the traffic in the peripheral format into the translated traffic in a network packet format.

16. The apparatus of claim 15, wherein the peripheral format corresponds to a peripheral component interconnect express (PCIe) datagram format employed for local peripheral devices; and wherein the network packet format comprises Ethernet frames or Internet Protocol (IP) packets.

17. The apparatus of claim 11, comprising program instructions stored on the one or more non-transitory computer readable storage media, the program instructions executable by the processing system to direct the processing system to at least:

initiate instantiation of the peripheral device into the local peripheral interconnect interface by at least triggering an entry point process for the peripheral device in the local peripheral interconnect interface to emulate a hardware hot-plugging process of the peripheral device into the host device.

18. The apparatus of claim 17, comprising program instructions stored on the one or more non-transitory computer readable storage media, the program instructions executable by the processing system to direct the processing system to at least:

initiate de-instantiation of the peripheral device from the local peripheral interconnect interface by at least triggering an exit point process for the peripheral device in the local peripheral interconnect interface that issues a detach command to the local peripheral interconnect interface for the peripheral device to emulate a hardware unplugging process of the peripheral device from the host device.

19. A system, comprising:

a local interface configured to communicate with a local peripheral interconnect interface of a host device;

a remote interface configured to communicate over a network interface of the host device;

an interworking unit configured to:

obtain traffic for a peripheral device issued by an application through a device driver to the local peripheral interconnect interface of the host device;

translate the first traffic into translated traffic comprising a network packet format suitable for the network interface of the host device, wherein the peripheral device is identified in a header portion for the translated traffic, wherein the peripheral device is identified in the header portion by at least a device-specific network port and address; and transfer the translated traffic over the network interface for delivery to the peripheral device.

20. The system of claim 19, comprising:

the interworking unit configured to:

receive additional traffic issued by the peripheral device and received over the network interface;

translate the additional traffic into translated additional traffic comprising a peripheral format suitable for the local peripheral interconnect interface; and emulate the peripheral device as a locally coupled device to the local peripheral interconnect interface by at least providing the translated additional traffic over the local peripheral interconnect interface to reach the device driver.

* * * * *